United States Patent
Murakami et al.

(10) Patent No.: US 6,853,606 B2
(45) Date of Patent: Feb. 8, 2005

(54) MAGNETO-OPTICAL STORAGE MEDIUM CAPABLE OF TRANSFERRING MAGNETIC DOMAIN FROM RECORDING LAYER TO REPRODUCING LAYER

(75) Inventors: Motoyoshi Murakami, Osaka (JP); Keiji Nishikiori, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/315,274

(22) Filed: Dec. 10, 2002

(65) Prior Publication Data

US 2003/0103420 A1 Jun. 5, 2003

Related U.S. Application Data

(62) Division of application No. 09/540,714, filed on Mar. 31, 2000, now Pat. No. 6,519,211.

(30) Foreign Application Priority Data

Apr. 1, 1999 (JP) .............................................. 11-95596

(51) Int. Cl.[7] ............................................. G11B 11/00
(52) U.S. Cl. ............................... 369/13.44; 369/13.08; 369/13.46; 428/694 MM
(58) Field of Search ........................... 369/13.08, 13.54, 369/13.49, 13.44, 13.46, 13.47, 13.55, 13.51, 13.52, 13.42; 428/694 ML, 694 MM, 694 SC

(56) References Cited

U.S. PATENT DOCUMENTS

| | | | |
|---|---|---|---|
| 5,422,865 A | 6/1995 | Katayama et al. ............ 369/13 |
| 5,459,701 A | 10/1995 | Tokita et al. .................. 369/13 |
| 5,757,734 A | * 5/1998 | Nakajima et al. ......... 369/13.15 |
| 5,790,513 A | * 8/1998 | Hiroki et al. ............ 369/13.47 |
| 5,945,228 A | * 8/1999 | Nishikiori ............ 428/694 ML |
| 5,955,191 A | * 9/1999 | Hirokane et al. ........ 369/13.47 |
| 5,963,512 A | 10/1999 | Inoue et al. .................. 369/13 |
| 6,120,921 A | 9/2000 | Yoshinari et al. .... 428/694 ML |
| 6,345,016 B1 | 2/2002 | Shiratori .................. 369/13.54 |

* cited by examiner

Primary Examiner—Tan Dinh
(74) Attorney, Agent, or Firm—Snell & Wilmer, LLP

(57) ABSTRACT

A magneto-optical recording medium includes a substrate and a reproducing layer and a recording layer provided on the substrate. A recording magnetic domain is provided in the recording layer by heating the recording layer by irradiation with light and applying a recording magnetic field to the recording layer so that information is recorded in the recording layer. The recording layer is a magnetic film having magnetic anisotropy in a direction perpendicular to the film surface, and the magnetic film holds the recording magnetic domain formed therein.

36 Claims, 17 Drawing Sheets

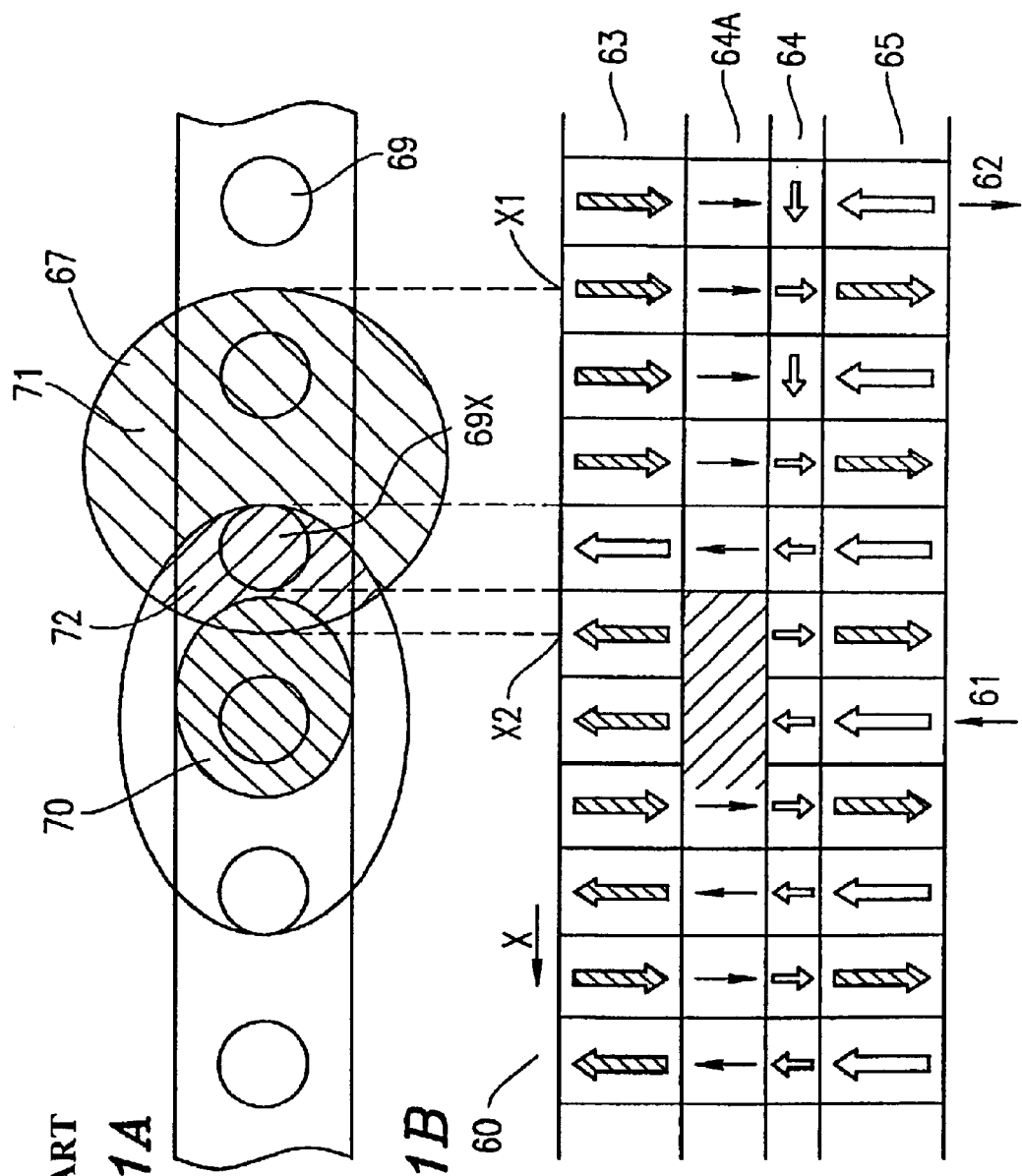
PRIOR ART FIG. 1A
PRIOR ART FIG. 1B 1.4mW 2.2mW

MAGNETO-OPTICAL STORAGE MEDIUM CAPABLE OF TRANSFERRING MAGNETIC DOMAIN FROM RECORDING LAYER TO REPRODUCING LAYER

BACKGROUND OF THE INVENTION

1. Field of the Invention

The present invention relates to a magneto-optical recording disk onto which information is written or deleted using a rising temperature due to irradiation of laser light and from which a recorded signal is read using a magneto-optical effect. The present invention also relates to a method and device for reproducing information recorded on the magneto-optical recording disk.

2. Description of the Related Art

In magneto-optical recording, a portion of a magnetic film of a magneto-optical recording medium is locally heated to a Curie point or compensation composition temperature or higher by irradiation of laser light. The heated portion is magnetized in the direction of an external magnetic field, thereby forming a recording magnetic domain where an information signal is recorded. The magnetic film onto which the information signal is recorded is also referred to as a recording magnetic film (or simply recording film).

Among such magneto-optical recording methods for the magneto-optical recording medium is a magnetic field modulation recording method. In this method, the temperature of an overall recording magnetic film is increased by irradiation of laser light. An external magnetic field having a modulated direction in accordance with a recording signal is applied to a given portion of the recording magnetic film. The recording signal is thermomagnetically recorded on the given portion. This is called a magnetic field modulation recording method. Alternatively, laser light having a modulated intensity in accordance with a recording signal is irradiated onto a given portion of a recording magnetic film. The temperature of the given portion is increased so that the recording signal is thermomagnetically recorded onto the given portion. This is called an optical modulation recording method.

In a conventional magneto-optical recording medium, when the size of the recording magnetic domain is smaller than or equal to the diameter of a reproducing light spot, recording magnetic domains at the front and rear side of the recording magnetic domain which is a target to be reproduced are included in the reproducing light spot (i.e., a detection range). Interference of the adjacent recording magnetic domains causes a decrease in the reproduced signal, whereby the S/N ratio is reduced or the reproduction signal is not output.

A magneto-optical recording and reproducing method using magnetic super-resolution as shown in FIGS. 1A and 1B is a proposed technique to solve such a problem (see Nikkei Electronics, No. 539, Oct. 28, 1991). This magneto-optical recording and reproducing method will be briefly described below.

As shown in a cross-sectional view of FIG. 1B, a magneto-optical recording medium 60 includes a reproducing magnetic film 63, a transcribing magnetic film 64A, an intermediate film 64, and a recording magnetic film 65 which are successively provided on a substrate (not shown). An arrow X in FIG. 1B indicates a moving direction along a track of the magneto-optical recording medium 60. An upward arrow 61 indicates a magnetic field for recording and reproduction. A downward arrow 62 indicates an initial magnetic field.

FIG. 1A is a plan view illustrating a part of a track of the magneto-optical recording medium 60.

As shown in FIGS. 1A and 1B, when reproducing information, a reproducing light spot 67 is formed along the track. When laser light is irradiated onto the rotating magneto-optical recording medium 60, the temperature distribution of a magnetic film structure including the reproducing magnetic film 63 and the transcribing magnetic film 64A are not rotation symmetrical around the center of the circular reproducing light spot 67. Specifically, a region 70 which has been irradiated by the reproducing light spot 67 has a high temperature greater than or equal to the Curie temperature Tc of the transcribing magnetic film 64A (the region 70 is referred to as a high temperature region 70). A crescent-shaped region 72, which is positioned at the left side of the reproducing light spot 67 and outside the high temperature region 70, has an intermediate temperature (the region 72 is referred to as an intermediate temperature region 72). A region 71 which is positioned at the right side of the intermediate temperature region 72 and within the reproducing light spot 67 has a low temperature (the region 71 is referred to as a low temperature region 71).

Assuming that a signal (information) is already thermomagnetically recorded as a recording magnetic domain 69 on the recording magnetic film 65, the transcribing magnetic film 64A is strongly exchange-coupled with the reproducing magnetic film 63. The intermediate film 64 is provided in such a manner that the magnetic domain wall becomes stable when the magnetization direction of the reproducing magnetic film 63 is in agreement with the magnetization direction of the recording magnetic film 65.

The reproducing operation of the magneto-optical recording medium 60 thus constructed will be described below.

The reproducing magnetic film 63 initially has the same magnetization direction as that of the initializing magnetic field 62. Upon reproduction, laser light for reproduction is irradiated to a range between X1 and X2 shown in FIG. 1B. The laser light forms the reproducing light spot 67 on the rotating magneto-optical recording medium 60. This causes an increase in temperature of the rotating magneto-optical recording medium 60, resulting in a temperature distribution shown in FIG. 1A (i.e., the temperature region 70, 71, and 72). The coercive force of the reproducing magnetic film 63 is decreased due to the temperature increase. Exchange-coupling with the recording magnetic film 65 is therefore dominant in the intermediate temperature region 72, so that the magnetization of the reproducing magnetic film 63 is directed to the magnetization direction of the recording magnetic film 65.

In the high temperature region 70 having a temperature of Tc or higher, the magnetization of the transcribing magnetic film 64A disappears in some portions thereof. Exchange-coupling between the reproducing magnetic film 63 and the recording magnetic film 65 is cut off at these portions, so that the magnetization of the reproducing magnetic film 63 is directed to the magnetization direction of the reproducing magnetic field 61. Accordingly, the low and high temperature regions 71 and 70 within the reproducing light spot 67 masks the recording magnetic domains 69. Only from a recording magnetic domain 69X positioned in the intermediate temperature region 72 is information read as a reproduced signal.

With the above-described method, even when a single recording magnetic domain 69 has a size smaller than the diameter of the reproducing light spot 67, there occurs substantially no interference by recording magnetic domains 69 ahead of and behind the single recording magnetic domain 69. It is therefore possible to reproduce information stored in high density.

There is, however, a drawback with the above-described magneto-optical recording medium 60 as it needs the initializing magnetic field 62 for initially directing the magnetization of the reproducing magnetic film 63 in a single direction.

Japanese Laid-Open Publication No. 5-81717 proposes a magneto-optical recording medium 80 having a structure shown in FIGS. 2A and 2B which does not need the initializing magnetic field.

As shown in a cross-sectional view of FIG. 2B, the magneto-optical recording medium 80 includes a reproducing magnetic film 83 and a recording magnetic film 85 on a substrate (not shown). An arrow X represents a moving direction along a track of the magneto-optical recording medium 80. As is different from the magneto-optical recording medium 60 shown in FIGS. 1A and 1B, an in-plane magnetization film is used as the reproducing magnetic film 83 in the magneto-optical recording medium 80.

FIG. 2A is a plan view illustrating part of the track of the magneto-optical recording medium 80. Similar to the magneto-optical recording medium 60 described with reference to FIGS. 1A and 1B, laser light is irradiated in a range between X1 and X2 along the track of FIG. 2B upon reproduction. The laser light forms a reproducing light spot 87. When laser light is irradiated onto the rotating magneto-optical recording medium 80, the temperature distributions of a reproducing magnetic film 83 and a transcribing magnetic film 85 are not rotation symmetrical around the center of the circular reproducing light spot 87. Specifically, a region which has been irradiated by the reproducing light spot 87 and is currently irradiated by a left-end portion of the reproducing light spot 87 forms a high temperature region 90. A region which is included in the reproducing light spot 87 and outside the high temperature region 90 forms a low temperature region 91. Also in this case, a recording magnetic domain 89 is smaller than the reproducing light spot 87.

The reproducing operation of the magneto-optical recording medium 80 thus constructed will be described below.

Assuming that a recording signal has been previously recorded in the recording magnetic domains 89 of the recording magnetic film 85 by the thermomagnetically recording, the reproducing magnetic film 83 is an in-plane magnetization film having a magnetic anisotropy in an in-plane direction parallel to the film at room temperature. Only the high temperature region 90 within the reproducing light spot 87 of the reproducing magnetic film 83 is a vertical magnetization film having a magnetic anisotropy in a direction perpendicular to the film. When laser light for reproduction is irradiated onto a range between X1 and X2 shown in FIG. 2B, the temperature of the magneto-optical recording medium 80 is increased so that the high temperature region 90 and the low temperature region 91 are formed. In the high temperature region 90, the reproducing magnetic film 83 is changed to the vertical magnetization film, and is exchange-coupled with the recording magnetic film 85 so that the magnetization of the reproducing magnetic film 83 is directed to the magnetization direction of the recording magnetic film 85. When the magneto-optical recording medium 80 is moved in the X direction so that the temperature of the magneto-optical recording medium 80 is decreased, the reproducing magnetic film 83 is changed to an in-plane magnetization film.

In the magneto-optical recording medium 80, information stored in the recording magnetic domains 89 which are smaller than the reproducing light spot 87 can thus be reproduced without the initializing magnetic field.

In the magneto-optical recording medium 80, when the reproducing magnetic film 83 includes an in-plane magnetization film, the initialized magnetization field is not necessary. However, there are the following drawbacks.

The magnetization direction of the reproducing magnetic film 83 is attracted toward the recording magnetic film 85 due to magnetic coupling between the reproducing magnetic film 83 and the recording magnetic film 85. For this reason, the magnetization direction of the reproducing magnetic film 83 is not held in an ideal in-plane magnetization direction but has a vertical component of magnetization in the low temperature region 91 even within the light spot. As a result, transcription occurs even in a region which does not need transcription of the recording magnetic domain 89. This leads to insufficient resolution upon reproduction or occurrence of noise upon transcription.

Further, the critical temperature of the reproducing magnetic 83 at which it changes from an in-plane magnetization film to a vertical magnetization film is constant. For this reason, as the reproducing power of a laser beam for reproduction is changed, the region where the recording magnetic domain 89 is transcribed is changed, whereby waveform interference degrades the reproduction characteristic.

Furthermore, as a magneto-optical recording medium having a high resolution and a high-performance reproduction characteristic without the need for an initializing magnetic field, there is a magneto-optical recording medium having a reproducing magnetic film of a shrink type (magnetic domain wall shrink type). Assuming that a recording signal is read only from a particular temperature region within the reproducing light spot, the use of this shrink type reproducing magnetic film leads to an unstable shrink operation in the arrangement including only the recording magnetic film and the reproducing magnetic film. To address this, the decreased magnetic coupling force may allow stabilization of the shrink operation. In this case, there is a problem in that the signal transcription from the recording magnetic film is insufficient.

Furthermore, assuming that the magnetic domain is enlarged by utilizing the shrink operation or magnetic domain wall shift, when a conventional guide groove is used in association with a tracking servo, operation by the magnetic domain wall shift is prevented due to the influence of the guide groove, thereby reducing the amplitude of a reproduced signal. Alternatively, the influence of noise due to the groove causes a reduction in CNR upon reproduction of a signal. The above are also drawbacks.

SUMMARY OF THE INVENTION

According to one aspect of the present invention, a magneto-optical recording medium, includes a substrate; and a reproducing layer and a recording layer provided on the substrate. A recording magnetic domain is provided in the recording layer by heating the recording layer by irradiation with light and applying a recording magnetic field to the recording layer in such a manner that information is recorded in the recording layer. The recording layer is a magnetic film having magnetic anisotropy in a direction perpendicular to the film surface, and the magnetic film holds the recording magnetic domain formed therein. The magneto-optical recording medium further comprises an intermediate layer and a reproducing aid layer between the reproducing layer and the recording layer. Saturated magnetization of the reproducing aid layer increases with an increase in the temperature of the reproducing aid layer. In a temperature range where reproduction is performed by irradiation of reproducing light, the recording magnetic domain of the recording layer is transcribed onto the reproducing layer via the reproducing aid layer, and the information recorded in the recording layer is reproduced. The reproducing layer is a vertical magnetic film having a magnetic characteristic such that outside the reproducing temperature range, the recording magnetic domain in the reproducing layer transcribed from the recording layer shrinks and disappears.

According to another aspect of the present invention, a magneto-optical recording medium includes a substrate; and a reproducing layer and a recording layer provided on the substrate. A recording magnetic domain is provided in the recording layer by heating the recording layer by irradiation with light and applying a recording magnetic field to the recording layer in such a manner that information is recorded in the recording layer. The recording layer is a magnetic film having magnetic anisotropy in a direction perpendicular to the film surface, and the magnetic film holds the recording magnetic domain formed therein. The magneto-optical recording medium further comprises an intermediate layer and a reproducing aid layer between the reproducing layer and the recording layer. In the reproducing aid layer, magnetic anisotropy in an in-plane direction parallel to the film surface is changed to magnetic anisotropy in a direction perpendicular to the film surface, as temperature of the reproducing aid layer is increased. In a temperature range where reproduction is performed by irradiation of reproducing light, the recording magnetic domain of the recording layer is transcribed onto the reproducing layer via the reproducing aid layer, and the information recorded in the recording layer is reproduced. The reproducing layer is a vertical magnetic film having a magnetic characteristic such that outside the reproducing temperature range, the recording magnetic domain in the reproducing layer transcribed from the recording layer shrinks and disappears.

In one embodiment of this invention, the reproducing aid layer is a magnetic film having a characteristic such that saturated magnetization is maximized when reproducing the information magnetically transcribed from the recording layer.

In one embodiment of this invention, the reproducing aid layer is a magnetic film having a characteristic such that the magnetic anisotropy in a direction perpendicular to the film surface is maximized when reproducing the information magnetically transcribed from the recording layer.

In one embodiment of this invention, the reproducing aid layer is a magnetic film having a characteristic such that the magnetic anisotropy in an in-plane direction parallel to the film surface is dominant at room temperature, and the magnetic anisotropy in a direction perpendicular to the film surface is dominant when reproducing the information magnetically transcribed from the recording layer.

In one embodiment of this invention, the reproducing aid layer is a magnetic film having a characteristic such that the magnetic anisotropy in an in-plane direction parallel to the film surface is dominant in a temperature range higher than when reproducing the information magnetically transcribed from the recording layer.

In one embodiment of this invention, the reproducing aid layer is a magnetic film having a characteristic such that film surface temperature of a portion of a light spot is greater than or equal to a Curie temperature when reproducing the information magnetically transcribed from the recording layer.

In one embodiment of this invention, the intermediate layer is made of a non-magnetic material.

In one embodiment of this invention, the nonmagnetic intermediate layer is made of dielectric film or non-magnetic alloy film.

In one embodiment of this invention, the nonmagnetic intermediate layer is made of a non-magnetic alloy reflecting film including at least one of Al, Cu, Ag, and Au.

In one embodiment of this invention, the nonmagnetic intermediate layer is made of an oxide or nitride dielectric film including at least one of Si, Al, Ta, and Ge; a chalcogen-based compound dielectric film; or a mixed dielectric film including at least one of said dielectric films.

In one embodiment of this invention, the intermediate layer is made of magnetic material having magnetic anisotropy in an in-plane direction parallel to the film surface.

In one embodiment of this invention, the intermediate layer is a magnetic film having a characteristic such that film surface temperature of a portion of a light spot is greater than or equal to a Curie temperature when reproducing the information magnetically transcribed from the recording layer.

In one embodiment of this invention, the reproducing layer is a magnetic film of a magnetic domain wall shrink type.

In one embodiment of this invention, the reproducing layer is a magnetic film of a magnetic domain wall shrink type; and the size of the recording magnetic domain provided in the recording layer is different from the size of the recording magnetic domain in the reproducing layer transcribed from the recording layer in the reproducing temperature range.

In one embodiment of this invention, the reproducing layer is a magnetic film of a magnetic domain wall shrink type; and the recording magnetic domain in the reproducing layer transcribed from the recording layer in the reproducing temperature range is stable only when the size thereof is greater than or equal to a predetermined size.

In one embodiment of this invention, the reproducing layer is a magnetic film of a magnetic domain wall shrink type; and the reproducing layer has a compensation composition temperature between room temperature and the Curie temperature.

In one embodiment of this invention, a magnetic domain wall is moved in the reproducing layer in a temperature region around the transcribing temperature when transcribing from the recording layer in the reproducing temperature range.

In one embodiment of this invention, the recording layer is a magnetic film having a characteristic such that saturated magnetization is maximized when reproducing the information magnetically transcribed from the recording layer.

In one embodiment of this invention, in a temperature region from room temperature Troom to transcribing temperature Tsw1, a force eliminating the recording magnetic domain in the reproducing layer is greater than a magnetic coupling force between the recording layer, and the reproducing layer and the reproducing aid layer; and in a temperature region greater than or equal to the transcribing temperature Tsw1, a magnetic coupling force from the recording layer is greater than the force eliminating the recording magnetic domain in the reproducing layer, so that the recording magnetic domain held in the recording layer is transcribed onto the reproducing layer via the reproducing aid layer.

In one embodiment of this invention, Troom<Tsw1<Tc1 and Troom<Tsw1<Tc3 are satisfied where Tc1 is the Curie temperature of the reproducing layer, Troom is room temperature, and Tsw1 is the transcribing temperature.

In one embodiment of this invention, the reproducing aid layer is a magnetic film such that the magnetic anisotropy in an in-plane direction parallel to the film surface is dominant in a temperature region less than the transcribing temperature Tsw1, and the magnetic anisotropy in a direction perpendicular to the film surface is dominant in a temperature region greater than or equal to the transcribing temperature Tsw1.

In one embodiment of this invention, the recording layer, the reproducing layer, and the reproducing aid layer are made of rare earth-transition metal amorphous alloy.

According to another aspect of the present invention, a method for reproducing information from a magneto-optical recording medium, wherein in a reproducing temperature range around a temperature at which saturated magnetization of a recording layer is maximized, a magnetic coupling force between the recording layer and a reproducing layer via a reproducing aid layer is greater than a force shrinking a magnetic domain wall of the reproducing layer, and a recording magnetic domain recorded in the recording layer is transcribed onto the reproducing layer so that the information is reproduced, includes the steps of: increasing the temperature of the magneto-optical recording medium irradiated by laser light and included in an inside part of a light spot to a temperature range including a temperature at which the saturated magnetization of at least the recording layer or the reproducing aid layer is maximized; and reproducing the information only from a temperature region within the light spot where the information can be transcribed from the recording layer by a magnetic coupling force between the recording layer and the reproducing layer, by transcribing the recording magnetic domain from the recording layer onto the reproducing layer.

In one embodiment of this invention, in the reproducing step, the size of the recording magnetic domain transcribed onto the reproducing layer is enlarged and the information is detected.

In one embodiment of this invention, in the reproducing step, the information is detected while applying an external magnetic field to the reproducing layer.

According to another aspect of the present invention, an apparatus for reproducing information from a magneto-optical recording medium, wherein in a reproducing temperature range around a temperature at which saturated magnetization of a recording layer is maximized, a magnetic coupling force between the recording layer and a reproducing layer via a reproducing aid layer is greater than a force shrinking a magnetic domain wall of the reproducing layer, and a recording magnetic domain recorded in the recording layer is transcribed onto the reproducing layer so that the information is reproduced, includes: a heating section for increasing the temperature of the magneto-optical recording medium irradiated by laser light and included in an inside part of a light spot to a temperature range including a temperature at which saturated magnetization of at least the recording layer or the reproducing aid layer is maximized. The information is detected only from a temperature region within the light spot where the information can be transcribed from the recording layer by a magnetic coupling force between the recording layer and the reproducing layer, by transcribing the recording magnetic domain from the recording layer onto the reproducing layer.

According to another aspect of the present invention, a magneto-optical recording medium, includes: a substrate; and a reproducing layer and a recording layer provided on the substrate. A recording magnetic domain is provided in the recording layer by heating the recording layer by irradiation with light and applying a recording magnetic field to the recording layer in such a manner that information is recorded in the recording layer; the recording layer is a magnetic film having magnetic anisotropy in a direction perpendicular to the film surface, and the magnetic film holds the recording magnetic domain formed therein; the magnetic domain recorded in the recording layer is transcribed onto the reproducing layer in a vertical magnetization direction; and a coercive force of the reproducing layer is smaller than a transcribing magnetic field from the recording layer to the reproducing layer in a temperature region greater than or equal to a reproducing and transcribing temperature at which the magnetic domain of the recording layer is transcribed onto the reproducing layer.

According to another aspect of the present invention, a magneto-optical recording medium, includes: a substrate; and a reproducing layer and a recording layer provided on the substrate. A recording magnetic domain is provided in the recording layer by heating the recording layer by irradiation with light and applying a recording magnetic field to the recording layer in such a manner that information is recorded in the recording layer: the recording layer is a magnetic film having magnetic anisotropy in a direction perpendicular to the film surface, and the magnetic film holds the recording magnetic domain formed therein; the magnetic domain recorded in the recording layer is transcribed onto the reproducing layer in a vertical magnetization direction; and a coercive force of the reproducing layer is smaller than the intensity of a magnetic field inverting magnetization of the recording layer in a temperature region greater than or equal to a reproducing and transcribing temperature at which the magnetic domain of the recording layer is transcribed onto the reproducing layer.

According to another aspect of this invention, a magneto-optical recording medium, includes: a substrate; and a reproducing layer and a recording layer provided on the substrate. A recording magnetic domain is provided in the recording layer by heating the recording layer by irradiation with light and applying a recording magnetic field to the recording layer in such a manner that information is recorded in the recording layer; the recording layer is a magnetic film having magnetic anisotropy in a direction perpendicular to the film surface, and the magnetic film holds the recording magnetic domain formed therein; the magnetic domain recorded in the recording layer is transcribed onto the reproducing layer in a vertical magnetization direction; and a coercive force of the reproducing layer is smaller than a force moving a magnetic domain wall of the reproducing layer in a temperature region greater than or equal to a reproducing and transcribing temperature at which the magnetic domain of the recording layer is transcribed onto the reproducing layer.

In one embodiment of this invention, the magneto-optical recording medium includes a disk substrate on which prepits are discretely provided; a recording layer in which information is recorded by a magnetization having a vertical direction; and a reproducing layer onto which a magnetic domain recorded in the recording layer is transcribed by the magnetization having a vertical direction.

In one embodiment of this invention, a guide groove has a convex-and-concave shape and is provided on the disk substrate.

In one embodiment of this invention, the reproducing layer, onto which a magnetic domain recorded in the recording layer is transcribed by the magnetization having a vertical direction, is magnetically separated between each information track.

In one embodiment of this invention, at least a magnetic layer having magnetic anisotropy in a direction perpendicular to the film surface is provided between the recording layer and the reproducing layer; a magnetic domain recorded in the recording layer is transcribed onto the reproducing layer by the magnetization having a vertical direction; and the Curie temperature of the at least magnetic layer is smaller than the Curie temperature of the recording layer and the reproducing layer.

In one embodiment of this invention, the reproducing layer, onto which a magnetic domain recorded in the recording layer is transcribed by the magnetization having a vertical direction, has a compensation composition temperature smaller than the reproducing and transcribing temperature at which the magnetic domain of the recording layer is transcribed onto the reproducing layer.

In one embodiment of this invention, the magneto-optical recording medium further includes a non-magnetic intermediate layer between the recording layer and the reproducing layer; and a magnetic domain recorded in the recording layer is transcribed onto the reproducing layer by the magnetization having a vertical direction.

In one embodiment of this invention, the magneto-optical recording medium further comprises an intermediate magnetic layer between the recording layer and the reproducing layer; a magnetic domain recorded in the recording layer is transcribed onto the reproducing layer by the magnetization having a vertical direction; and the intermediate magnetic layer has an in-plane magnetic anisotropy in a temperature region smaller than or equal to the reproducing and transcribing temperature at which the magnetic domain of the recording layer is transcribed onto the reproducing layer.

In one embodiment of this invention, a coercive force of the reproducing layer is smaller than the intensity of a modulated magnetic field when recording in a temperature range of from room temperature to about 100° C.

In one embodiment of this invention, a coercive force of the recording layer is greater than or equal to about 3 K Oe at room temperature; and the coercive force is smaller than or equal to about 500 Oe in a temperature range of from about 200° C. to about 250° C.

According to another aspect of the present invention, a method for reproducing recorded information from the magneto-optical recording medium is provided, wherein a light beam is moved relative to the medium; the medium is irradiated with the light beam from the reproducing layer side; a temperature distribution which has a gradient in a moving direction of a spot of the light beam is provided on the medium; the temperature distribution includes a temperature region greater than at least the Curie temperature of an intermediate magnetic layer; a magnetic domain wall of a transcribed magnetic domain of the reproducing layer is moved; and a change in polarized plane of a reflected light of the light beam is detected to reproduce the recorded information. The intermediate magnetic layer is provided between the reproducing layer and the recording layer.

According to another aspect of the present invention, an apparatus for reproducing recorded information from the magneto-optical recording medium is provided, wherein the apparatus comprises a heating section for providing a temperature distribution which has a gradient in a moving direction of a spot of a light beam on the magneto-optical recording medium; and a change in polarized plane of a reflected light of the light beam is detected to reproduce the recorded information.

According to this invention, the above-described structure allows minimization of the coercive force in the reproducing layer when the temperature thereof is increased. This weakens the force blocking and obstructing the magnetic domain wall in the recording domain, thereby securing a sufficient magnetic domain wall mobility even for high-density recording.

Further, the formation of discrete prepits in the substrate leads to a reduction in coercive force in the reproducing layer. A force based on the substrate shape which blocks the magnetic domain wall shift also can be reduced. The coercive force is reduced to about 500 Oe or less by a temperature of about 150° C. or higher so that sufficient recording and reproducing characteristics are secured.

In a method using the magnetically induced super-resolution such as FAD and RAD, a reproducing field or initializing magnetic field is required upon reproduction of a signal. According to this invention, an external magnetic field is not required upon reproduction of a signal. The magnetization of the reproducing layer upon recording a signal is sufficiently small and does not exert an influence on the recording magnetic field characteristic.

Furthermore, in particular, there is substantially no influence from noise caused by the groove shape when both land and groove are used for recording for the purpose of high-density recording. SNR is therefore excellent. Signal characteristics are effectively improved when a track pitch is narrow.

Thus, the invention described herein makes possible the advantages of providing: (1) a magneto-optical recording medium having a high resolution and high performance without the use of an initializing magnetic field, in which in a particular temperature region within a reproducing light spot, two operating characteristics, i.e., a magnetic super-resolution mask due to a shrink operation (a magnetic domain wall shrink operation) or magnetic domain wall shift and a transcription capability of a reproducing layer for a recording signal, can both be improved; (2) a method for reproducing the above-described magneto-optical recording medium suitable for high-density recording; and (3) an apparatus for reproducing the above-described magneto-optical recording medium suitable for high-density recording.

These and other advantages of the present invention will become apparent to those skilled in the art upon reading and understanding the following detailed description with reference to the accompanying figures.

BRIEF DESCRIPTION OF THE DRAWINGS

FIG. 1A is a plan view illustrating part of a track of a conventional magneto-optical recording medium.

FIG. 1B is a cross-sectional view illustrating a configuration (particularly, the magnetization direction) of the conventional magneto-optical recording medium shown in FIG. 1A.

DESCRIPTION OF THE PREFERRED EMBODIMENTS

Figures 2A, 2B:
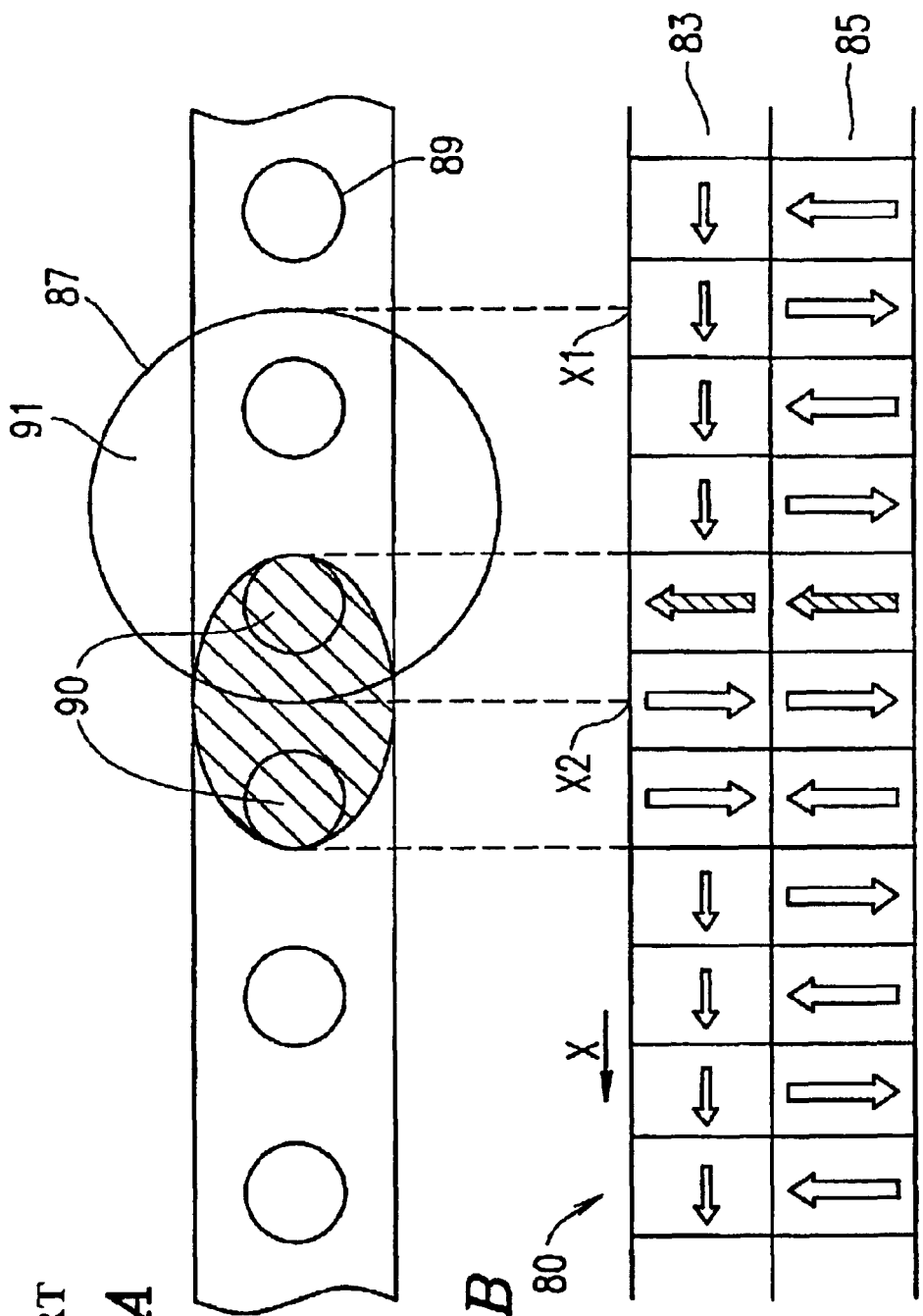
FIG. 2A is a plan view illustrating part of a track of another conventional magneto-optical recording medium.
FIG. 2B is a cross-sectional view illustrating a configuration (particularly, the magnetization direction) of the conventional magneto-optical recording medium shown in FIG. 2A.
Figure 3:
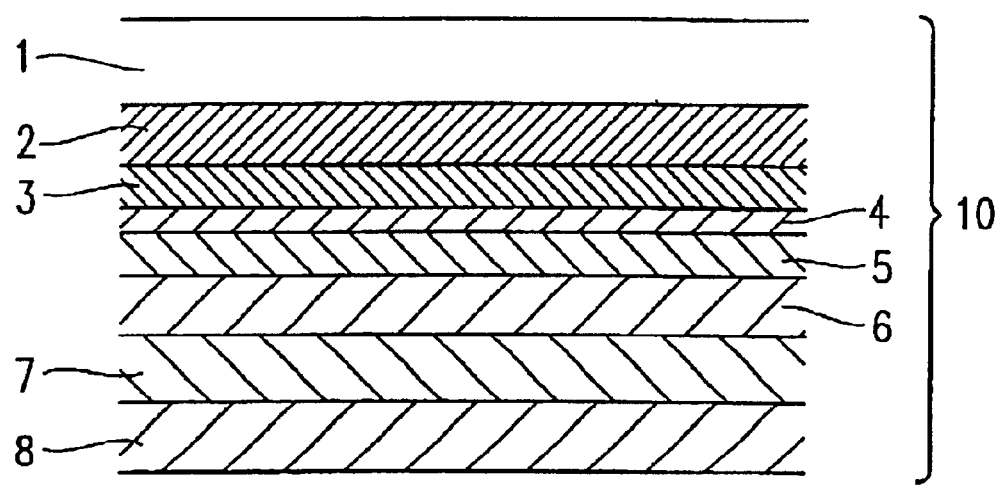
FIG. 3 is a cross-sectional view illustrating a configuration of a magneto-optical recording medium according to each Example of this invention.

FIG. 3 is a cross-sectional view illustrating a configuration of a magneto-optical recording medium 10 according to examples of this invention.

The magneto-optical recording medium 10 includes a substrate 1, and a first dielectric layer 2, a reproducing layer 3, a reproducing aid layer 4, an intermediate layer 5, a recording layer 6, a second dielectric layer 7, and an overcoat layer (protecting layer) 8 which are provided on the substrate 1.

The substrate 1 included in the magneto-optical recording medium 10 typically has a structure in which guide grooves or prepits are formed on glass using photopolymer, or a structure made of plastic such as a polycarbonate. The first and second dielectric layers 2 and 7 are typically made of a ZnS film or a SiN film. The reproducing layer 3 and the reproducing aid layer 4 are made of a GdFeCo film having different molar fractions, for example. The intermediate layer 5 is made of a SiN film or a DyFe film. The recording layer 6 is made of a TbFeCo film, for example. The overcoat layer 8 provided on the recording layer 6 is, for example, an epoxy acrylate resin.

The magneto-optical recording medium 10 is provided on the substrate 1 by forming the above-described layers 2 through 7 using sputtering or vacuum deposition followed by forming the overcoat layer using spin coating. The layers 2 through 7 have, for example, the following thickness. The dielectric layers have a thickness of about 60 nm to about 120 nm. The reproducing layer 3 has a thickness of about 10 nm to about 80 nm. The reproducing aid layer 4 has a thickness of about 5 nm to about 50 nm. The intermediate layer has a thickness of about 5 nm to about 50 nm. The recording layer 6 has a thickness of about 30 nm to about 100 nm.

Figure 4A:
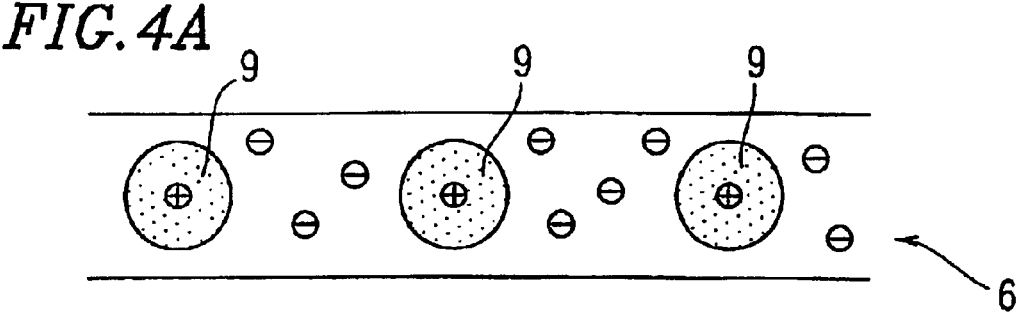
FIG. 4A is a diagram illustrating a state at room temperature of one track on which a recording magnetic domain is thermomagnetically recorded, in the magneto-optical recording medium of this invention shown in FIG. 3, viewed from the recording layer side.
Figure 4B:
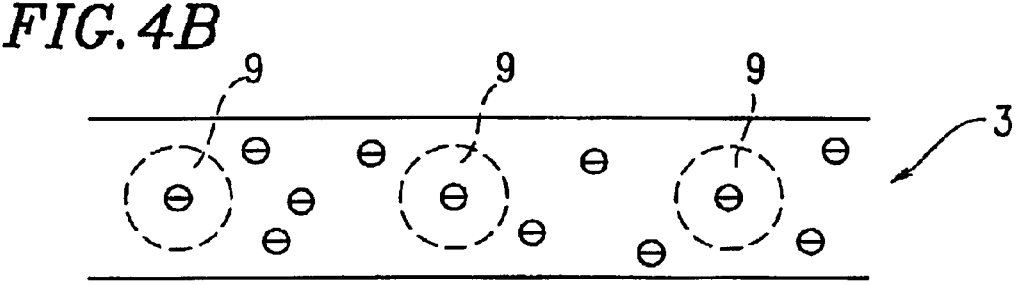
FIG. 4B is a diagram illustrating a state at room temperature of one track on which a recording magnetic domain is thermomagnetically recorded, in the magneto-optical recording medium of this invention shown in FIG. 3, viewed from the reproducing layer side.

FIGS. 4A and 4B are diagrams illustrating states at room temperature of a track in which recording magnetic domains 9 are formed by thermomagneticaly recording in the magneto-optical recording medium 10 of this invention. Specifically, FIG. 4A represents a state viewed from the recording layer 6. FIG. 4B represents a state viewed from the reproducing layer 3. In FIGS. 4A and 4B, the polarity of magnetization (magnetization direction) in the recording magnetic domain 9 is represented as positive. The polarity of a portion in which the recording magnetic domain 9 is not provided is represented by negative (this magnetization direction is opposite to that of the recording magnetic domain 9).

As shown in FIG. 4A, the recording layer 6 includes the recording magnetic domains 9 having the positive polarity. On the other hand, the reproducing layer 3 included in the magneto-optical recording medium 10 of this invention has a strong self-shrink force and its magnetic coupling force with the recording layer 6 is reduced by the intermediate layer 5. In the reproducing layer 3, therefore, the magnetization direction of the recording magnetic domains 9 is directed to the polarity (i.e., the negative direction) of a portion surrounding the recording magnetic domains 9 in the recording layer 6. As a result, the recording magnetic domains 9 in the reproducing layer 3 which should have been normally transcribed from the recording layer 6 shrink so that the recording magnetic domain 9 is not formed on the reproducing layer 3 (this state is indicated by a dashed line in FIG. 4B).

The magneto-optical recording medium 10 of this invention is initialized by utilizing the shrink action of the reproducing layer 3.

A conventional magneto-optical recording medium, which includes a reproducing layer made of vertical magnetization film, is initialized by directing the magnetization direction of the reproducing layer to a single direction using a magnetic field. For this reason, the recording magnetic domains are formed until the initializing magnetic field is applied. In the magneto-optical recording medium 10 of this invention, although the recording magnetic domains 9 are formed in the reproducing layer 3 upon reproduction, the recording magnetic domains 9 in the reproducing layer 3 subsequently disappear substantially automatically due to a shrink force of the reproducing layer 3 (i.e., the recording magnetic domains 9 are not held in the reproducing layer 3). The substantially entire reproducing layer 3 has the same magnetization direction at the time other than when reproducing, without utilization of the initializing magnetic field.

Next, a magnetic characteristic of a reproducing magnetic film used as the reproducing layer 3 of the magneto-optical recording medium 10 of this invention will be described with reference to FIGS. 5A through 5C.

Figure 5A:
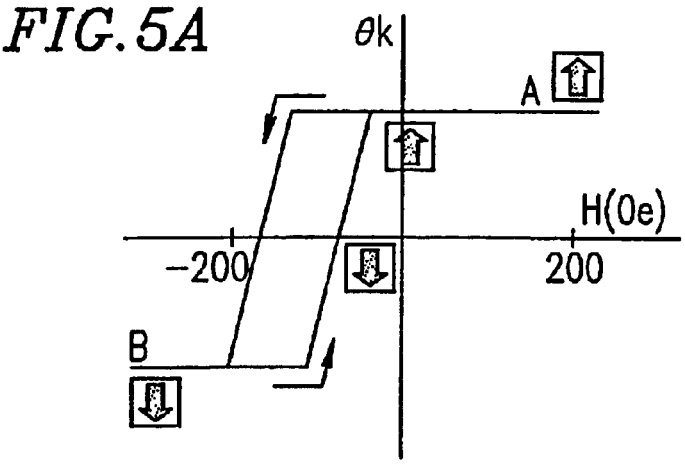
FIG. 5A is a graph showing the results of the measurement of a magnetic characteristic (Kerr hysteresis loop and magnetization direction in a monolayer state) of a reproducing layer (GdFeCo film) used in the magneto-optical recording medium of this invention shown in FIG. 3 where the Gd molar fraction is about 28%.
Figure 5B:
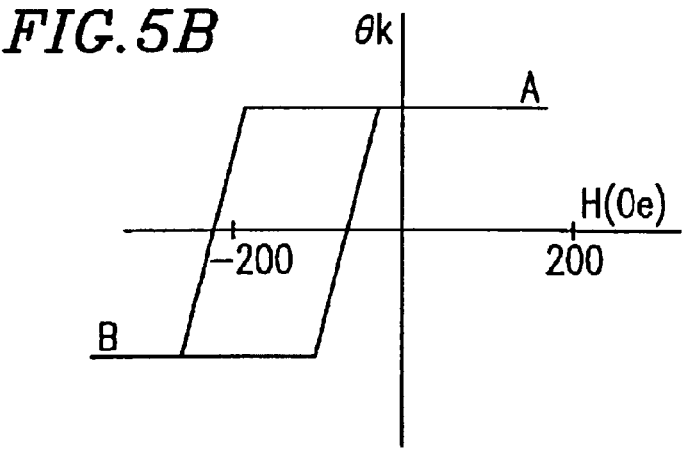
FIG. 5B is a graph showing the results of the measurement of a magnetic characteristic (Kerr hysteresis loop and magnetization direction in a monolayer state) of a reproducing layer (GdFeCo film) used in the magneto-optical recording medium of this invention shown in FIG. 3 where the Gd molar fraction is about 27%.
Figure 5C:
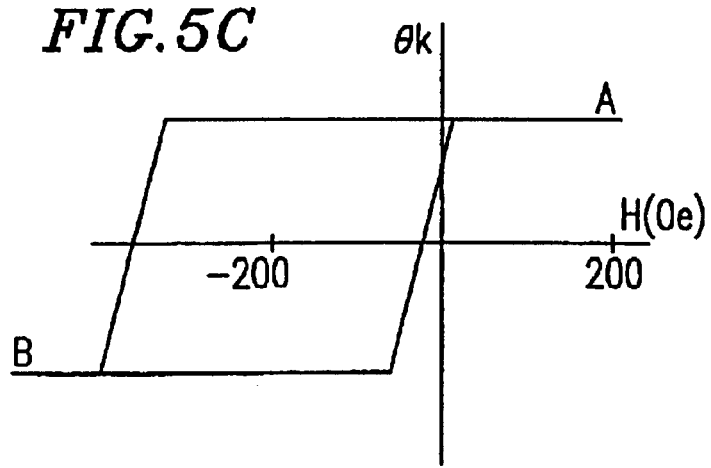
FIG. 5C is a graph showing the results of the measurement of a magnetic characteristic (Kerr hysteresis loop and magnetization direction in a monolayer state) of a reproducing layer (GdFeCo film) used in the magneto-optical recording medium of this invention shown in FIG. 3 where the Gd molar fraction is about 26%.

FIGS. 5A through 5C show the Kerr hysteresis loop and magnetization state of a reproducing layer 3 which is a monolayer. In each figure, the horizontal axis represents a magnetic field H while the vertical axis represents a Kerr angle of rotation θk. The reproducing film 3 is a GdFeCo film having a thickness of about 500 Å formed on the substrate. The entire reproducing layer 3 is polarized in the positive direction. FIG. 5A shows the result of a measurement in the case where the molar fraction of Gd of the reproducing layer 3 (GdFeCo film) is 28%. FIG. 5B shows the result of a measurement in the case where the molar fraction of Gd is 27%. FIG. 5C shows the result of a measurement in the case where the molar fraction of Gd is 26%.

In FIG. 5A, as the magnetic field H is applied across the reproducing layer 3 from the positive side to the negative side, a magnetization state indicated by A is inverted to a magnetization state B due to a magnetic field of about −180 Oe. When the magnetic field H is applied across the reproducing layer 3 toward the positive side from the magnetization state B, the magnetization state of the reproducing layer 3 is inverted again to the magnetization state A due to a magnetic field of about −70 Oe which is negative. The above-described inversion of magnetization from A to B corresponds to formation of a recording magnetic domain upon recording a signal the monolayer reproducing layer 3. The inversion of magnetization from B to A corresponds to erasing of a recording magnetic domain in the reproducing layer 3.

In a magnetic film as is used as the reproducing layer in a conventional magneto-optical recording medium, a magnetic field causing the magnetization inversion from B to A has a sign opposite to that of a magnetic field causing the magnetization inversion from A to B. For this reason, the magnetic film has a magnetization in a direction of a recording magnetic field in the absence of an applied magnetic field, thereby holding the recording magnetic domain.

On the other hand, in the reproducing layer 3 of this invention, a magnetic field inverting the magnetization from B to A is negative as described above with reference to FIG. 5A. This means that the reproducing layer 3 returns to the magnetization state A in the absence of an applied magnetic field. Specifically, this is because the recording magnetic domain in the reproducing layer 3 shrinks and disappears due to influence from surrounding magnetization which is positively polarized.

The graphs shown in FIGS. 5A through 5C which show results of the measurement of the reproducing layers 3 having different Gd molar fractions will now be compared to each other. The shrinking force of the recording magnetic domain of the above-described reproducing layer 3 is reduced, as the Gd molar fraction of the reproducing layer 3 is decreased. FIG. 5C has the smallest shrinking force among FIGS. 5A through 5C. Consequently, control of the Gd molar fraction of the reproducing layer 3 allows for the formation of a reproducing layer 3 having an appropriate magnitude of shrinking force.

The magneto-optical recording medium 10 of this invention includes the reproducing aid layer 4 and the intermediate layer 5. Due to the intermediate layer 5, magnetic coupling is largely blocked in a region to which a signal is not transcribed from the recording layer 6 within the light spot. As a result, the shrinking force of the recording magnetic domain of the reproducing layer 3 which is transcribed from the recording layer 6 becomes more stable.

With the reproducing aid layer 4, the transcribed temperature region of the recording layer 6 can obtain an increased magnetic coupling force, resulting in more secure transcription of a signal.

The magnetic films included in the magneto-optical recording medium 10 of this invention may be produced with sputtering under a gas pressure of about 0.6 Pa to about 2.0 Pa. In this production process, the Gd molar fraction of the resultant magnetic field varies depending on conditions for formation of the films such as a gas pressure, a bias magnetic field, and the type of sputtering gas, as well as, the apparatus used. For example, as the gas pressure changes from about 1.5 Pa to about 0.5 Pa in formation of the film, the Gd molar fraction in GdFeCo varies in a range of from about 24% to about 28%.

In view of the conditions for formation of the films, the reproducing layer 3 included in the magneto-optical recording medium 10 of this invention can obtain the above-described shrink operation with the Gd molar fraction of GdFeCo in the reproducing layer 3 being in a range of from about 15% to about 30%.

In the foregoing description, in one embodiment of the reproducing layer 3 is made from a GdFeCo film. Alternatively, the reproducing layer 3 may be made from a magnetic film containing another rare earth transition metal, a Mn-based magnetic film, or another material-based magnetic film. Specifically, examples of compositions from which the reproducing layer 3 can be formed include GdFeCo, GdFe, GdCo, DyFeCo, and MnBi. Examples of compositions from which the reproducing aid layer 4 can be formed include GdFe, DyFe, and TbFe. As a material of the intermediate layer 5, a non-magnetic material or magnetic material is used in the following examples.

Hereinafter, some examples of the magneto-optical recording medium of this invention having the above-described features will be described with reference to the accompanying drawings. Further, a method for reproducing the magneto-optical recording medium of this invention is performed in accordance with a procedure which will be described in association with the following examples. An apparatus for reproducing the magneto-optical recording medium of this invention has a structure which realizes the method for reproducing the magneto-optical recording medium of this invention which will be described in association with the following examples.

In examples described below, the magneto-optical recording media of this invention include the above-described reproducing layers having the same magnetic characteristic, but include different film arrangements. Each layer in the different examples has a different magnetic characteristic. Magnetic correlation between each layer varies among the examples.

EXAMPLE 1

Figure 6A:
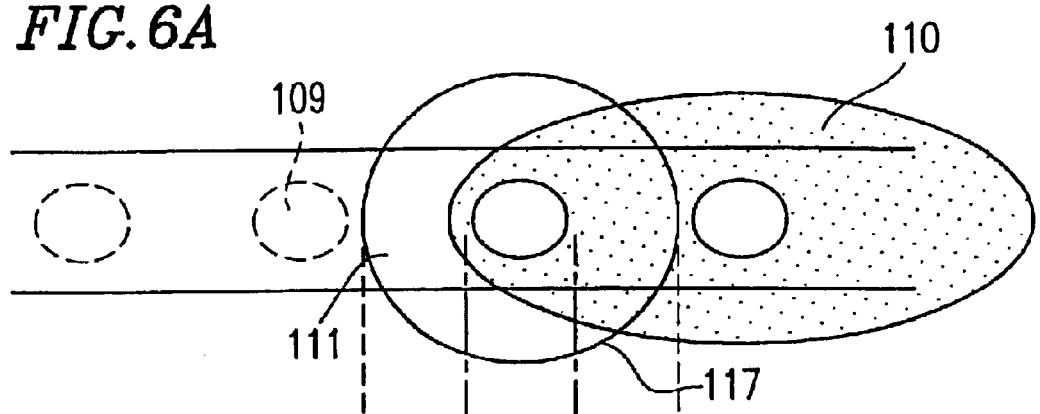
FIG. 6A is a plan view illustrating part of a track of a magneto-optical recording medium according to Example 1 of this invention in a reproducing operation.
Figure 6B:
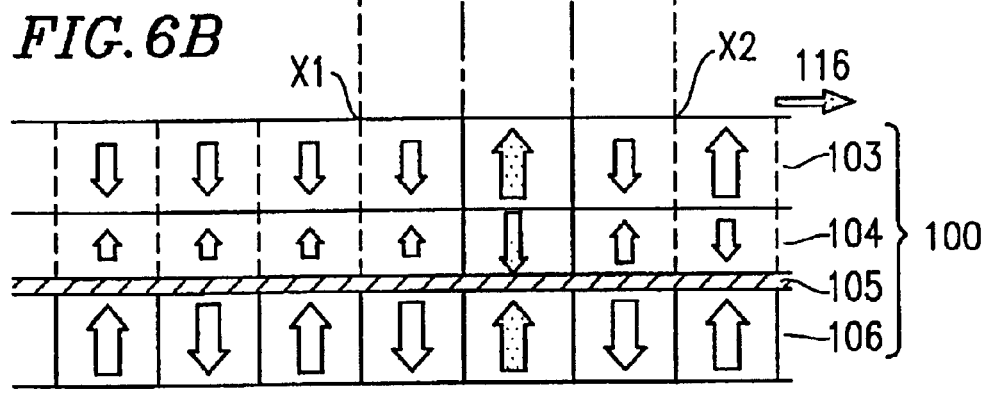
FIG. 6B is a cross-sectional view illustrating a configuration (particularly, the magnetization direction) of magnetic films included in the magneto-optical recording medium according to Example 1 of this invention in a reproducing operation.

FIGS. 6A and 6B are diagrams for explaining the reproduction operation of a magneto-optical recording medium 100 according to Example 1 of this invention. Specifically, FIG. 6A is a plan view illustrating part of a track of the magneto-optical recording medium 100. FIG. 6B is a cross-sectional view illustrating magnetization directions of magnetic films included in the magneto-optical recording medium 100.

The magneto-optical recording medium 100 includes a reproducing layer 103, a reproducing aid layer 104, an intermediate layer 105, and a recording layer 106 which are provided on a substrate (not shown) as shown in the cross-sectional view of FIG. 6B. An arrow 116 in FIG. 6B indicates a moving direction along a track of the magneto-optical recording medium 100.

When reproducing information, laser light is irradiated along a track in a range between X1 to X2 in FIG. 6B. As shown in the plan view of FIG. 6A, a reproducing light spot 117 is provided. When the laser light is irradiated onto the rotating magneto-optical recording medium 100, the temperature distribution of the magnetic film structure including the reproducing layer 103 is not rotation symmetrical around the center of the circular reproducing light spot 117. Specifically, the center of the temperature distribution is shifted toward the moving direction 116 of the magneto-optical recording medium 100. A region 110 of the reproducing light spot 117 which has been previously irradiated has a high temperature. In this high temperature region 110, the magnitude of magnetization of the reproducing aid layer 104 is increased. In a region of the reproducing layer 103 which has a temperature of Tsw1 or higher, transcription of a recording magnetic domain 109 occurs due to a magnetic coupling force between the recording layer 106 and the reproducing layer 103 via the reproducing aid layer 104. A region 111 other than the high temperature region 110 has a low temperature less than Tsw1.

Figure 7:
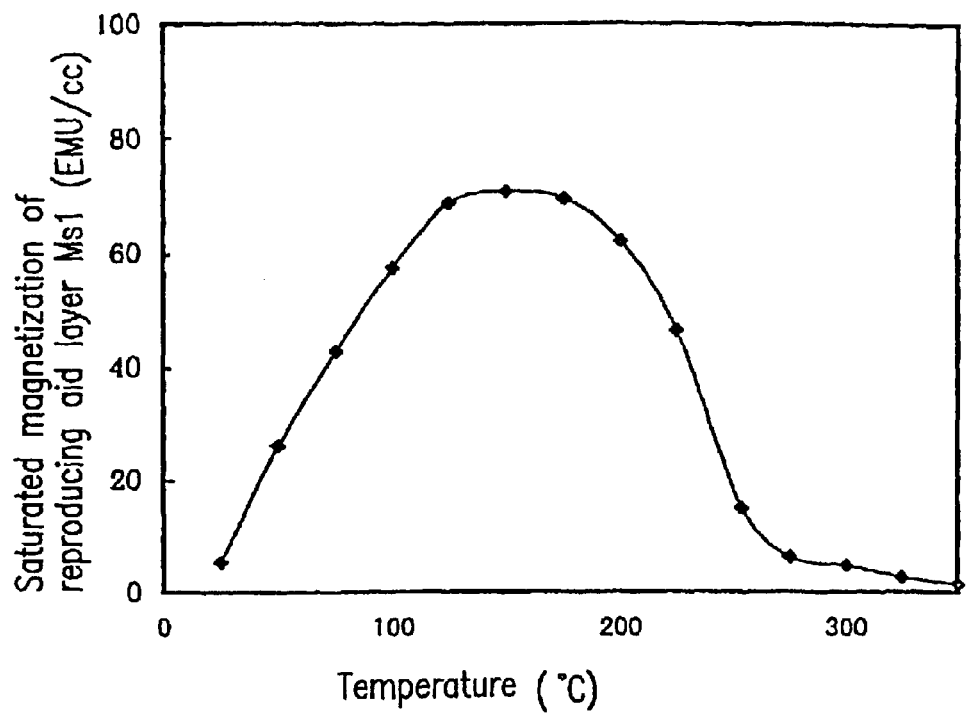
FIG. 7 is a graph showing a dependency characteristic of a reproducing aid layer on temperature at saturated magnetization in Example 1.
Figure 8:
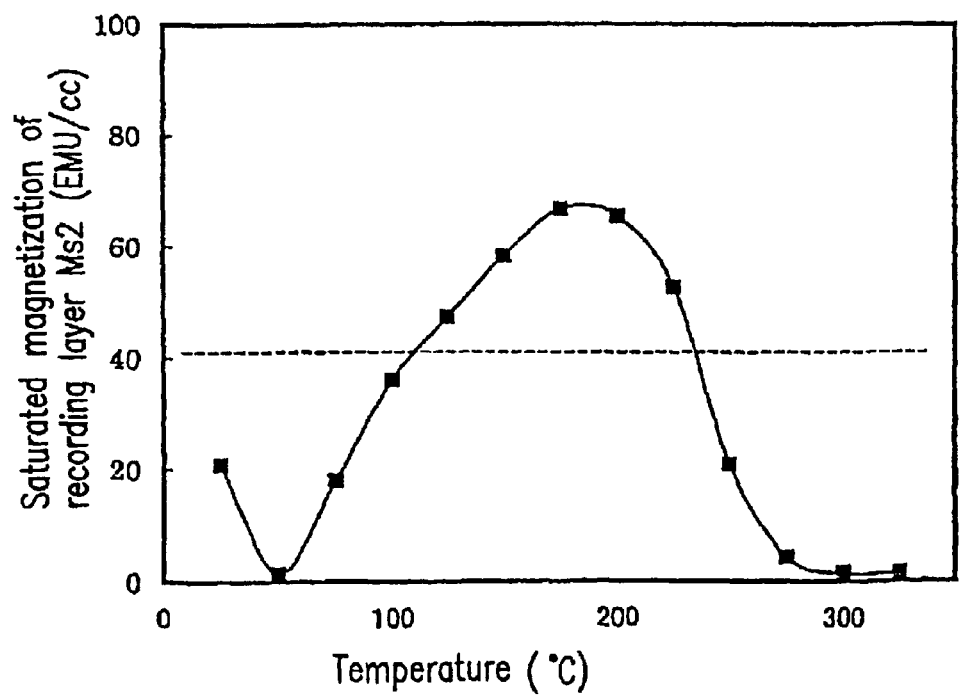
FIG. 8 is a graph showing a dependency characteristic of a recording layer on temperature at saturated magnetization in Example 1.

FIGS. 7 and 8 show dependency on temperature of saturated magnetization Ms1 and Ms2 of the reproducing aid layer 104 and recording layer 106 of the magneto-optical recording medium 100. As shown in FIG. 7, the saturated magnetization Ms1 of the reproducing aid layer 104 is increased as the temperature increases, and has a maximum at a temperature slightly higher than the temperature Tsw1 at which reproduction is initiated. In Example 1, reproduction can be performed in a temperature range of from about 110° C. to about 230° C. As shown in FIG. 8, the saturated magnetization Ms2 of the recording layer 106 also generally increases as the temperature increases, and has substantially a maximum at a temperature (about 190° C. in Example 1) within a range of the reproducing temperature.

At a temperature of Tsw1 or higher, the saturated magnetization Ms1 and Ms2 of the reproducing aid layer 104 and recording layer 106 are both increased, so that a strong magnetic coupling force is generated in between due to a static magnetic field.

In the structure of Example 1, a magnetization of about 40 emu/cc or more is required in order to transcribe a signal from the recording layer 106 to the reproducing layer 103. Reproduction can be performed at a temperature range exceeding a value indicated by a dashed line shown in FIG. 8.

An information signal is thermomagnetically recorded as the recording magnetic domains 109 in advance onto the recording layer 106. Laser light for reproduction is irradiated onto the rotating magneto-optical recording medium 100 upon reproduction of the information. The low temperature region 111 has a temperature less than Tsw1. In the low temperature region 111, the magnetization of the reproducing layer 103 is affected by a surrounding magnetic field so that the recording magnetic region 109 is not formed. On the other hand, in the high temperature region 110 of Tsw1 or higher, the saturated magnetization of the recording layer 106 and reproducing aid layer 104 is increased, so that a strong magnetic coupling force is generated between the saturated magnetization of the recording layer 106 and the reproducing aid layer 104 due to a static magnetic field. In this case, the reproducing aid layer 104 and the reproducing layer 103 are exchange-coupled with each other. The coupling force of the recording layer 106 acting on the reproducing layer 103 is therefore stronger than the shrinking force of the recording magnetic domain 109 in the reproducing layer 103. As a result, the recording magnetic domain 109 is transcribed onto the reproducing layer 103 via the intermediate layer 105 and the reproducing aid layer 104. The portion of the reproducing light spot 117 corresponding to the low temperature region 111 has a low level of magnetic interaction between the recording layer 106 and the reproducing aid layer 104. Further, the intermediate layer 105 effectively blocks such magnetic interaction. The recording magnetic domain 109 is thus masked. As a result, information is read as a reproduced signal only from the recording magnetic domain 109 at a position corresponding to the high temperature region 110.

As described above, in the magneto-optical recording medium 100 of Example 1, although the recording magnetic domain 109 is smaller than the reproducing light spot 117, there occurs substantially no interference by recording magnetic domains 109 ahead of and behind the former recording magnetic domain 109. It is therefore possible to reproduce information stored in high density.

To reproduce information stored in high density, the magneto-optical recording medium 100 of Example 1 needs to be heated with laser light for reproduction so as to obtain a region having a temperature of Tsw1 or higher.

The Curie point Tc3 of the recording layer 106 of the magneto-optical recording medium 100 is set to about 250° C. in order to hold the stable recording magnetic domain 109 which has been thermomagnetically recorded. Such recording magnetic domain 109 is not erased at the reproduction temperature.

The magnetic film included in each layer of the magneto-optical recording medium 100 can be easily produced from a rare earth metal-transition metal amorphous alloy which provides easy handling in fabrication and easy control of the magnetic characteristics. The reproducing aid layer 104 is used for controlling the magnetic coupling force between the reproducing layer 103 and the recording layer 106. To this end, the reproducing aid layer 104 is preferably made of a magnetic film having magnetic anisotropy in a direction perpendicular to the film surface and having a saturated magnetization Ms which increases with temperature. Specifically, examples of the composition of the reproducing aid layer 104 include GdFeCo, GdFe, GdCo, and DyFe. In Example 1, GdFe is used which has a composition such that a compensation composition temperature is less than or equal to room temperature.

The composition of each magnetic film used in the magneto-optical recording medium 100 needs to satisfy the following conditions in order to obtain the operation in a temperature range of Tsw1 or higher.

During operation of a disk drive, the temperature inside the apparatus may be increased up to about 50° C. by taking into account variation in the environmental temperature. To secure the power required for reproduction in such a situation, Tsw1 is preferably set to at least 80° C. or higher. On the other hand, when Tsw1 is higher than the Curie temperature Tc3 of the recording layer 106, the recording magnetic domain 109 of the recording layer 106 is destroyed upon reproduction. Therefore, Tsw1 needs to be set to a temperature less than Tc3.

Typically, the Curie temperature Tc3 of the recording layer 106 is designed so that the recording layer 106 has a sufficient recording sensitivity to recordation using semiconductor laser light. Preferably, Tc3 is in a range of from about 180° C. to about 300° C. Further, the Curie temperature Tsw1 of the reproducing layer 103 needs to be set to Tsw1 or higher in order to hold magnetization of a temperature region having the temperature of Tsw1 or higher.

In view of what is described above, Tsw1 is preferably about 100° C. to about 250° C.

Experiments conducted by the inventors demonstrate that a Gd molar fraction of about 15% to about 30% in the reproducing layer 103 leads to Tsw1 having the above-described temperature range. Further, to improve the quality of a reproduced signal and to prevent record destruction in the recording layer 106, Tsw1 is preferably as high as possible within the above-described allowable temperature range.

In view of the above-described points, the Gd molar fraction is preferably about 18% to about 25%, and Tsw1 is preferably about 130° C. to about 180° C.

For example, in the magneto-optical recording medium 100 of Example 1, Tsw1 is set to about 120° C. The composition of the reproducing layer 103 is $Gd_{22}Fe_{64}Co_{14}$. The composition of the reproducing aid layer 104 is $Gd_{28}Fe_{72}$. The composition of the recording layer 106 is $Tb_{20}Fe_{65}Co_{15}$.

Preferably, the intermediate layer 105 includes a non-magnetic dielectric layer or non-magnetic alloy layer. Specifically, the intermediate layer 105 may be made of a chalcogenide-based compound such as ZnS, ZnSe, and ZnTe, a nitride compound such as SiN and GeN, an oxide such as $TaO_x$ and $SiO_x$, or a mixed dielectric material including at least one of the above, or a reflecting film material such as Al, Cu, Ag, and Au, or a mixed alloy material including those material added with Cr, Ti, Ta, or the like. The intermediate layer 105 may have a multilayer structure including at least one layer made of those materials.

EXAMPLE 2

Figure 9A:
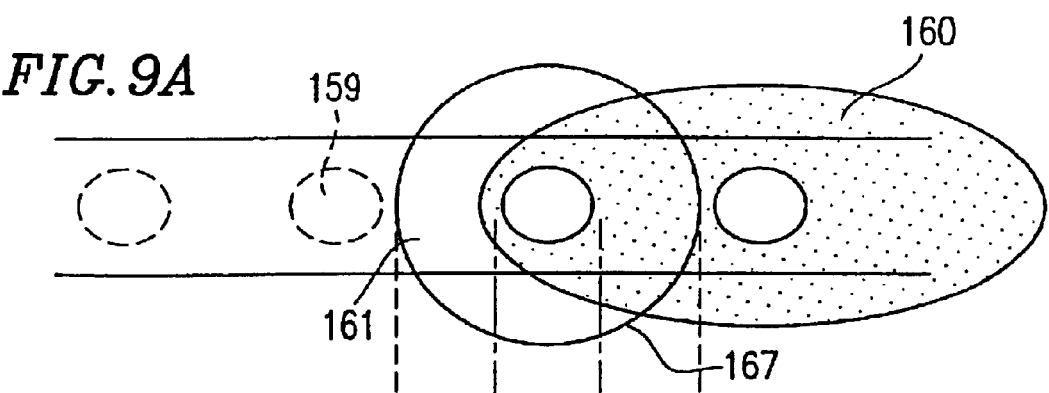
FIG. 9A is a plan view illustrating part of a track of a magneto-optical recording medium according to Example 2 of this invention in a reproducing operation.
Figure 9B:
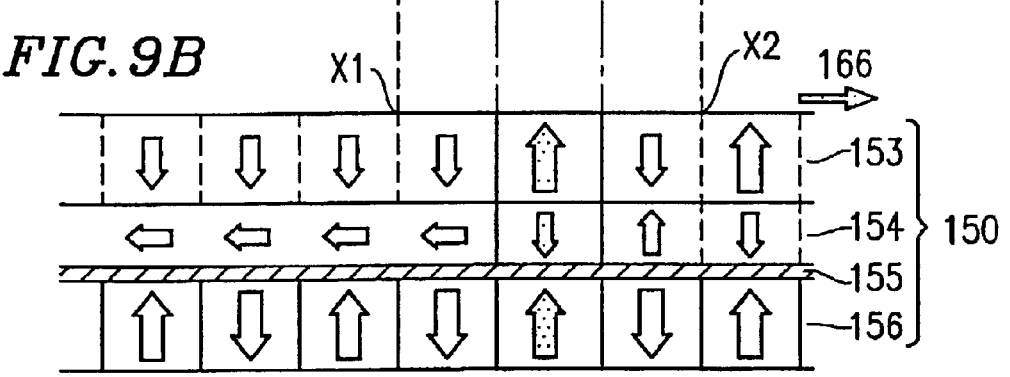
FIG. 9B is a cross-sectional view illustrating a configuration (particularly, the magnetization direction) of magnetic films included in the magneto-optical recording medium according to Example 2 of this invention in a reproducing operation.

FIGS. 9A and 9B are diagrams for explaining the reproduction operation of a magneto-optical recording medium 150 according to Example 2 of this invention. Specifically, FIG. 9A is a plan view illustrating part of a track of the magneto-optical recording medium 150. FIG. 9B is a cross-sectional view illustrating magnetization directions of magnetic films included in the magneto-optical recording medium 150.

The magneto-optical recording medium 150 includes a reproducing layer 153, a reproducing aid layer 154, an intermediate layer 155, and a recording layer 156 which are provided on a substrate (not shown) as shown in the cross-sectional view of FIG. 9B. An arrow 166 in FIG. 9B indicates a moving direction along a track of the magneto-optical recording medium 150.

When reproducing information, laser light is irradiated along a track in a range between X1 to X2 in FIG. 9B. As shown in the plan view of FIG. 9A, a reproducing light spot 167 is provided. When the laser light is irradiated onto the rotating magneto-optical recording medium 150, the temperature distribution of the magnetic film structure including the reproducing layer 153 is not rotation symmetrical around the center of the circular reproducing light spot 167. Specifically, the center of the temperature distribution is shifted toward the moving direction 166 of the magneto-optical recording medium 150. A region 160 of the reproducing light spot 167 which has been previously irradiated has a high temperature. In Example 2, the intensity of the reproducing laser light is adjusted in such a manner that the temperature of this high temperature region 160 is greater than or equal to Tsw1 where the reproducing aid layer 154 has magnetic anisotropy in a direction perpendicular to the film surface. A region 161 other than the high temperature region 160 has a low temperature less than Tsw1.

Figure 11A:
FIG. 11A is a graph showing the results of the measurement of a magnetic characteristic (Kerr hysteresis loop and magnetization direction in a monolayer state) of a reproducing aid layer (GdFeCo film) used in the magneto-optical recording medium of this invention where the temperature is room temperature.
Figure 11B:
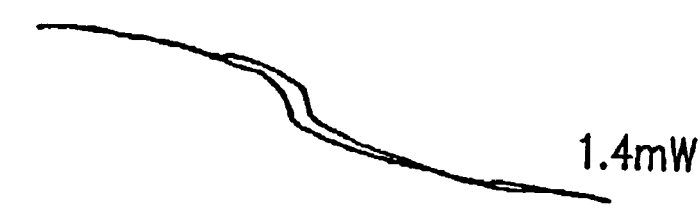
FIG. 11B is a graph showing the results of the measurement of a magnetic characteristic (Kerr hysteresis loop and magnetization direction in a monolayer state) of a reproducing aid layer (GdFeCo film) used in the magneto-optical recording medium of this invention where the temperature is about 100° C.
Figure 11C:
FIG. 11C is a graph showing the results of the measurement of a magnetic characteristic (Kerr hysteresis loop and magnetization direction in a monolayer state) of a reproducing aid layer (GdFeCo film) used in the magneto-optical recording medium of this invention where the temperature is about 170° C.

FIGS. 11A through 11C are graphs showing results of measurement of Kerr hysteresis loop when the temperature of the reproducing aid layer 154 is changed by changing the intensity of the reproducing laser light. Specifically, the results of the measurement shown in FIGS. 11A through 11C are obtained at room temperature, 100° C. (the intensity of the reproducing laser light is equal to 1.4 mW), and 170° C. (the intensity of the reproducing laser light is equal to 2.2 mW).

As shown in FIGS. 11A through 11C, the magnetic anisotropy of the reproducing aid layer 154 in a direction perpendicular to the film surface increases with an increase in the temperature. By comparison of FIGS. 11A through 11C, in the case of room temperature shown in FIG. 11A, the magnetic anisotropy is large in a direction perpendicular to the film surface. The magnetization direction substantially is not changed even in the presence of an applied magnetic field in a direction perpendicular to the film surface. In the case where the reproducing temperature is Tsw1 or higher as shown in FIG. 11C, the Kerr hysteresis loop has an increased angle ratio, so that the magnetic anisotropy in a direction perpendicular to the film surface is increased. With the reproducing aid layer 154 having such a characteristic, a recording magnetic domain 159 of the recording layer 156 is transcribed onto the reproducing layer 153 via the reproducing aid layer 154.

The principle of the reproduction of Example 2 will be described in greater detail below.

The recording layer 156 has a characteristic such that the saturated magnetization increases with an increase in the temperature, similar to Example 1. An information signal is thermomagnetically recorded as the recording magnetic domains 159 in advance onto the recording layer 156. Laser light for reproduction is irradiated onto the rotating magneto-optical recording medium 150 upon reproduction of the information signal. The low temperature region 161 within the laser light spot has a temperature less than Tsw1.

In such a low temperature region 161, the reproducing aid layer 154 has magnetic anisotropy in an in-plane direction parallel to the film surface. For this reason, the recording magnetic domain 159 of the recording layer 156 is blocked by the intermediate layer 155 and the reproducing aid layer 154 and is not transcribed onto the reproducing layer 153. The magnetization of the reproducing layer 153 is directed in a single direction due to the influence of the surrounding magnetic field.

On the other hand, in the high temperature region 160, the temperature of the reproducing aid layer 154 is increased to Tsw1 or higher. The magnetic anisotropy of the reproducing aid layer 154 in a direction perpendicular to the film surface is increased, so that a strong magnetic coupling force is generated between the recording layer 156 and the reproducing aid layer 154 via the intermediate layer 155 due to a static magnetic field. In this case, the reproducing aid layer 154 and the reproducing layer 153 are exchange-coupled with each other. The coupling force of the recording layer 156 acting on the reproducing layer 153 is therefore stronger than the shrinking force of a magnetic domain in the reproducing layer 153. As a result, the recording magnetic domain 159 of the recording layer 156 is transcribed onto the reproducing layer 153 via the intermediate layer 155 and the reproducing aid layer 154. The portion of the reproducing light spot 167 corresponding to the low temperature region 161 has a low level of magnetic interaction between the recording layer 156 and the reproducing aid layer 154. The recording magnetic domain 159 of the recording layer 156 is thus masked. As a result, information is read as a reproduced signal only from the recording magnetic domain 159 at a position corresponding to the high temperature region 160.

As described above, in the magneto-optical recording medium 150 of Example 2, although the recording magnetic domain 159 is smaller than the reproducing light spot 167, there occurs substantially no interference by recording magnetic domains 159 ahead of and behind the former recording magnetic domain 159. It is therefore possible to reproduce information stored in high density.

To reproduce information stored in high density, the magneto-optical recording medium 150 of Example 2 needs to be heated with laser light for reproduction so as to obtain a region in the reproducing aid region 154 having a temperature of Tsw1 or higher where the magnetization anisotropy in a direction perpendicular to the film surface is dominant.

In the magneto-optical recording medium 150, the reproducing aid layer 154 and the intermediate layer 155 control the magnetic coupling force between the reproducing layer 153 and the recording layer 156. Under certain conditions, the intermediate layer 155 is used for the purpose of cutting off the magnetic coupling force effectively. Therefore, the composition of a magnetic film included in the reproducing aid layer 154 needs to be designed in such a manner that the temperature Tsw1 is in a temperature range which the magnetic film heated by the reproducing light spot 167 can reach. Tsw1 is a temperature at which a characteristic having magnetic anisotropy in an in-plane direction parallel to the film surface transits to a characteristic having magnetic anisotropy in a direction perpendicular to the film surface.

To secure transcription of the recording magnetic domain 159 in the high temperature region 160, Tsw1 is preferably about 80° C. or higher. The Curie point Tc3 of the recording layer 156 is set to about 180° C. to about 300° C. In view of this, Tsw1 is preferably about 100° C. to about 250° C. to prevent record destruction. Further, to improve the quality of a reproduced signal, Tsw1 is preferably as high as possible within the above-described allowable temperature range. In view of the above-described points, Tsw1 is preferably about 130° C. to about 180° C.

For example, in the magneto-optical recording medium 150 of Example 2, Tsw1 is set to about 120° C. The composition of the reproducing layer 153 is $Gd_{22}Fe_{66}Co_{12}$. The composition of the reproducing aid layer 154 is $Gd_{29}Fe_{67}Co_4$. The composition of the recording layer 156 is $Tb_{20}Fe_{65}Co_{15}$.

EXAMPLE 3

Figure 10A:
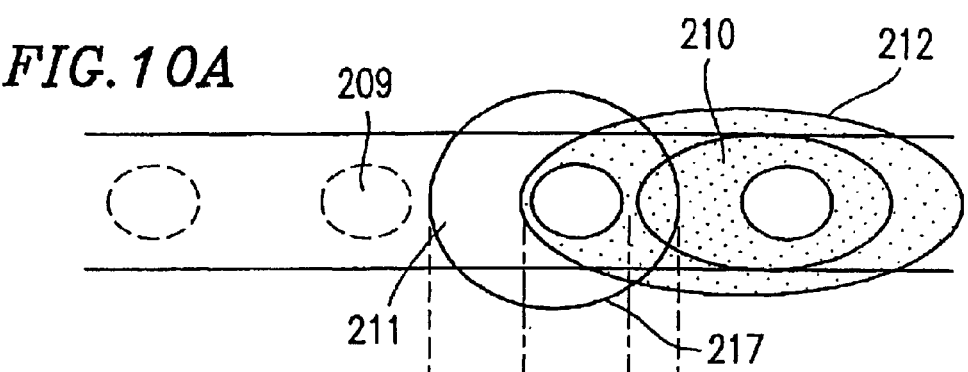
FIG. 10A is a plan view illustrating part of a track of a magneto-optical recording medium according to Example 3 of this invention in a reproducing operation.
Figure 10B:
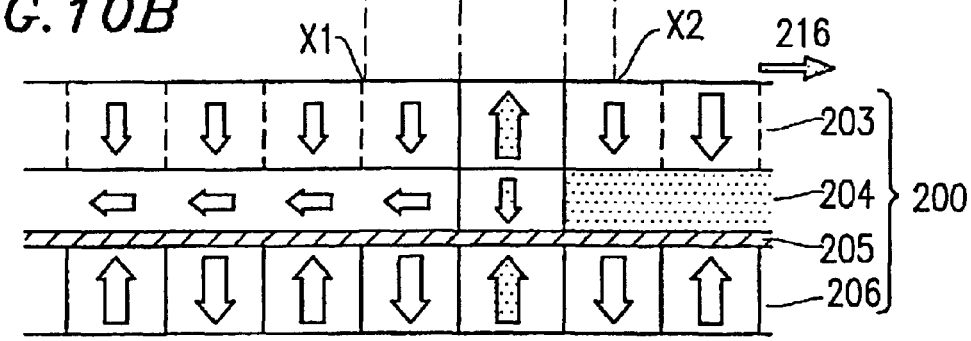
FIG. 10B is a cross-sectional view illustrating a configuration (particularly, the magnetization direction) of magnetic films included in the magneto-optical recording medium according to Example 3 of this invention in a reproducing operation.

FIGS. 10A and 10B are diagrams for explaining the reproduction operation of a magneto-optical recording medium 200 according to Example 3 of this invention. Specifically, FIG. 10A is a plan view illustrating part of a track of the magneto-optical recording medium 200. FIG. 10B is a cross-sectional view illustrating magnetization directions of magnetic films included in the magneto-optical recording medium 200.

The magneto-optical recording medium 200 includes a reproducing layer 203, a reproducing aid layer 204, an intermediate layer 205, and a recording layer 206 which are provided on a substrate (not shown) as shown in the cross-sectional view of FIG. 10B. An arrow 216 in FIG. 10B indicates a moving direction along a track of the magneto-optical recording medium 200.

When reproducing information, laser light is irradiated along a track in a range between X1 to X2 in FIG. 10B. As shown in the plan view of FIG. 10A, a reproducing light spot 217 is provided. When the laser light is irradiated onto the rotating magneto-optical recording medium 200, the temperature distribution of the magnetic film structure including the reproducing layer 203 is not rotation symmetrical around the center of the circular reproducing light spot 217. Specifically, a region 210 which has been previously irradiated has a high temperature. In Example 3, the intensity of the reproducing laser light is adjusted in such a manner that the temperature of this high temperature region 210 is greater than or equal to the Curie temperature Tc2 of the reproducing aid layer 204. There are regions 211 and 212 outside the high temperature region 210 which have a low temperature less than Tsw1 and an intermediate temperature greater than or equal to Tsw1 and less than Tc2, respectively.

The characteristic of Kerr hysteresis loop when the temperature of the reproducing aid layer 204 is changed by changing the intensity of the reproducing laser light is similar to what is described in FIGS. 11A through 11C in association with Example 2. The magnetic anisotropy of the reproducing aid layer 204 in a direction perpendicular to the film surface increases with an increase in the temperature. For this reason, a recording magnetic domain 209 of the recording layer 206 is transcribed onto the reproducing aid layer 204.

The principle of the reproduction of Example 3 will be described in greater detail below.

An information signal is thermomagnetically recorded as the recording magnetic domains 209 onto the recording layer 206. Laser light for reproduction is irradiated onto the rotating magneto-optical recording medium 200 upon reproduction of the information signal. The low temperature region 211 has a temperature less than Tsw1. The reproducing aid layer 204 has magnetic anisotropy in an in-plane direction parallel to the film surface. For this reason, the recording magnetic domain 209 of the recording layer 206 is blocked by the intermediate layer 205 and the reproducing aid layer 204 and is not transcribed onto the reproducing layer 203. The magnetization of the reproducing layer 203 is directed in a single direction due to influence of a surrounding magnetic field. On the other hand, in the high temperature region 210, the temperature of the reproducing aid layer 204 is increased to Tc2 or higher. The magnetic coupling force between the recording layer 206 and the reproducing aid layer 204 due to a static magnetic field is cut off. The coupling force between the recording layer 206 and the reproducing layer 203 due to a static magnetic field is weak. Information on the recording layer 206 is not transcribed onto the reproducing layer 203.

On the other hand, in the intermediate temperature region 212 having a temperature between or equal to Tsw1 and Tc2, the magnetic anisotropy in a direction perpendicular to the film surface is increased, so that a strong magnetic coupling force is generated between the recording layer 206 and the reproducing aid layer 204 via the intermediate layer 205 due to a static magnetic field. In this case, the reproducing aid layer 204 and the reproducing layer 203 are exchange-coupled with each other. The coupling force of the recording layer 206 acting on the reproducing layer 203 is therefore stronger than the shrinking force of a magnetic domain in the reproducing layer 203. As a result, the recording magnetic domain 209 of the recording layer 206 is transcribed onto the reproducing layer 203 via the intermediate layer 205 and the reproducing aid layer 204. Portions of the reproducing light spot 217 corresponding to the low temperature region 211 and the high temperature region 210 have a low level of magnetic interaction between the recording layer 206 and the reproducing aid layer 204. The recording magnetic domain 209 of the recording layer 206 is thus masked. As a result, information is read as a reproduced signal only from the recording magnetic domain 209 at a position corresponding to the intermediate temperature region 212.

As described above, in the magneto-optical recording medium 200 of Example 3, the recording magnetic domain 209 is masked in the portions of the reproducing light spot 217 corresponding to the low temperature region 211 and the high temperature region 210. As a result, information is read as a reproduced signal only from the recording magnetic domain 209 at a position corresponding to the intermediate temperature region 212.

Thus, in the magneto-optical recording medium 200 of Example 3, although the recording magnetic domain 209 is further smaller as compared with that of the magneto-optical recording medium 150 of Example 2, there occurs substantially no interference by recording magnetic domains 209 ahead of and behind the former recording magnetic domain 209. It is therefore possible to reproduce information stored in high density.

To reproduce information stored in high density, the magneto-optical recording medium 200 of Example 3 needs to be heated with laser light for reproduction so as to obtain a region where the reproducing aid region 204 has a temperature of Tc2 or higher.

In the magneto-optical recording medium 200, the reproducing aid layer 204 controls the magnetic coupling force between the reproducing layer 203 and the recording layer 206. Under certain conditions, the reproducing aid layer 204 is also used for the purpose of cutting off the magnetic coupling force effectively. Therefore, in addition to the conditions described in Example 2, as to the composition of magnetic film included in each layer of the magneto-optical recording medium 200, the Curie temperature Tc2 of the reproducing aid layer 204 needs to satisfy Tsw1<Tc2. In order to perform transcription in the intermediate temperature region 212 having a temperature greater than equal to Tsw1 and less than Tc2 and to prevent record destruction, Tc2<Tc1 and Tc2<Tc3 need to be satisfied where Tc2 is the Curie temperature of the reproducing aid layer 204, Tc1 is the Curie temperature of the reproducing layer 203, and Tc3 is the Curie temperature of the recording layer 206.

To secure transcription of the recording magnetic domain 209 in the intermediate temperature region 212, a difference in temperature between Tsw1 and Tc2 needs to be at least about 10° C. or higher. For this reason, when Tsw1 is about 80° C. or higher, Tc2 is preferably at least 90° C. or higher. Tc3 is set to about 180° C. to about 300° C. In view of this, Tsw1 and Tc2 are preferably about 100° C. to about 250° C. and about 110° C. to about 260° C., respectively, to prevent record destruction. Further, to improve the quality of a reproduced signal, Tsw1 is preferably as high as possible within the above-described allowable temperature range. In view of the above-described points, Tsw1 and Tc2 are preferably about 130° C. to about 180° C. and about 150° C. to about 220° C., respectively.

For example, in the magneto-optical recording medium 200, Tsw1 and Tc2 are set to about 130° C. and about 200° C., respectively. The composition of the reproducing layer 203 is $Gd_{22}Fe_{64}Co_{14}$. The composition of the reproducing aid layer 204 is $Gd_{27}Fe_{63}$. The composition of the recording layer 206 is $Tb_{20}Fe_{65}Co_{15}$. The intermediate layer 205 is made of non-magnetic material, similar to Example 1.

EXAMPLE 4

Figure 12A:
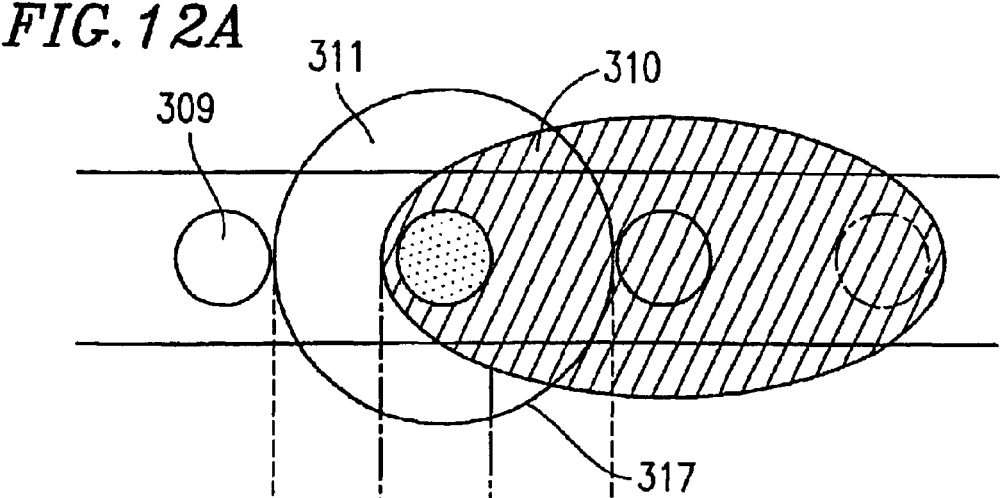
FIG. 12A is a plan view illustrating part of a track of a magneto-optical recording medium according to Example 4 of this invention in a reproducing operation.
Figure 12B:
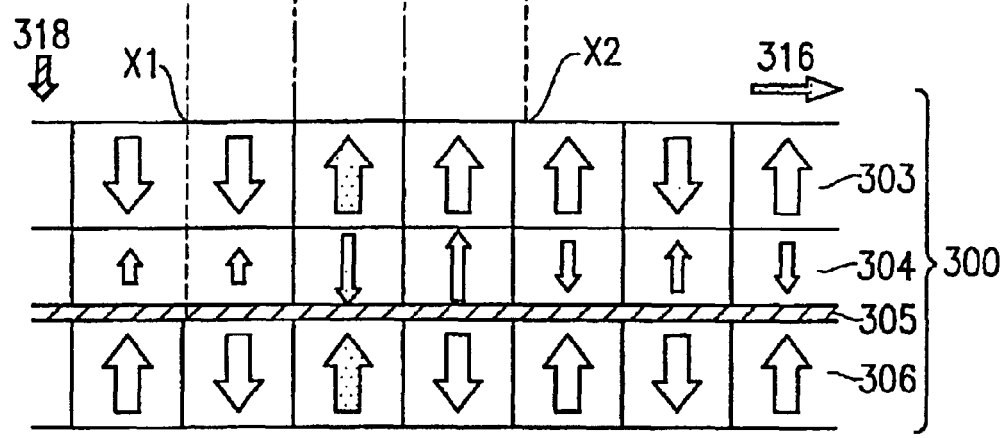
FIG. 12B is a cross-sectional view illustrating a configuration (particularly, the magnetization direction) of magnetic films included in the magneto-optical recording medium according to Example 4 of this invention in a reproducing operation.

FIGS. 12A and 12B are diagrams for explaining the reproduction operation of a magneto-optical recording medium 300 according to Example 4 of this invention. Specifically, FIG. 12A is a plan view illustrating part of a track of the magneto-optical recording medium 300. FIG. 12B is a cross-sectional view illustrating magnetization directions of magnetic films included in the magneto-optical recording medium 300.

The magneto-optical recording medium 300 includes a reproducing layer 303, a reproducing aid layer 304, an intermediate layer 305, and a recording layer 306 which are provided on a substrate (not shown) as shown in the cross-sectional view of FIG. 12B. An arrow 316 in FIG. 12B indicates a moving direction along a track of the magneto-optical recording medium 300.

The reproduction operation of a magneto-optical recording medium 300 of Example 4 is similar to that of the magneto-optical recording medium 100 of Example 1. Specifically, a low temperature region 311 where the temperature is less than Tsw1 does not have a recording magnetic domain formed due to the magnetic domain shrink of the reproducing layer 303. The magnetization of the reproducing aid layer 304 and recording layer 306 is increased only in a high temperature region 310 where the temperature is greater than or equal to Tsw1. The recording magnetic domain 309 of the recording layer 306 is transcribed onto the reproducing layer 303 via the intermediate layer 305 and the reproducing aid layer 304. A detailed description is omitted in view of this example's commonality with Example 1.

When it is assumed that a maximum temperature of the inside of a disk drive is about 80° C. during operation of the apparatus, Tsw1 is preferably set to about 130° C. to about 180° C. However, when Tsw1 is in such a temperature range, if the inside temperature of the apparatus exceeds the assumed maximum temperature, the recording magnetic domain 309 transcribed onto the reproducing layer 303 may have a temperature of Tsw1 or lower again. In this case, the shrink of the recording magnetic domain 309 is unlikely to occur when it should occur.

In order to secure the shrink of the recording magnetic domain 309 so that the improved quality and high reliability of a reproduced signal, a weak magnetic field 318 having the same direction as that of the recording magnetic domain 309 is applied as an initializing magnetic field to the magneto-optical recording medium 300 of Example 4. A sufficient intensity of the initializing magnetic field 318 is about 50 Oe to about 300 Oe. A rare earth magnet, for example, may be used to generate a magnetic field having an intensity of about 100 Oe.

In Example 4, as is different from conventional techniques, the initializing magnetic field 318 does not need to be provided in the vicinity of the reproducing light spot 317. Further, a very small magnetic field can be used as the initializing magnetic field 318. For this reason, the rare earth magnet or the like for generating the initializing magnetic field 318 can be incorporated into a disk cartridge accommodating the magneto-optical recording medium 300 or a magneto-optical disk drive.

EXAMPLE 5

Figure 13A:
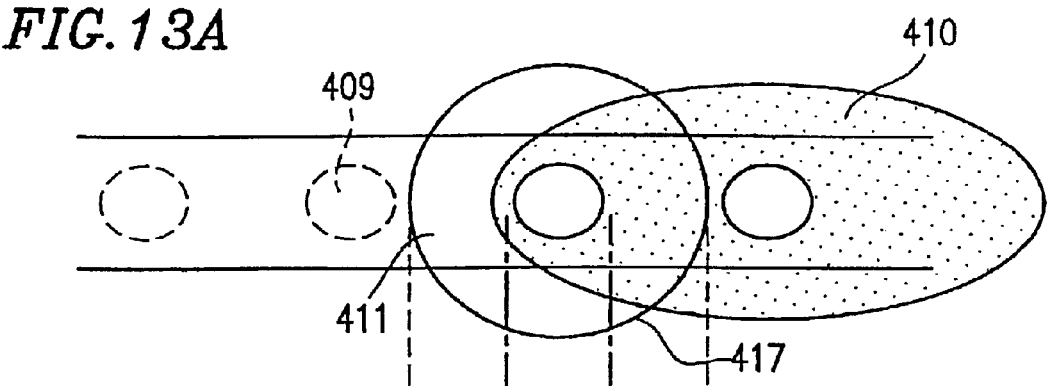
FIG. 13A is a plan view illustrating part of a track of a magneto-optical recording medium according to Example 5 of this invention in a reproducing operation.
Figure 13B:
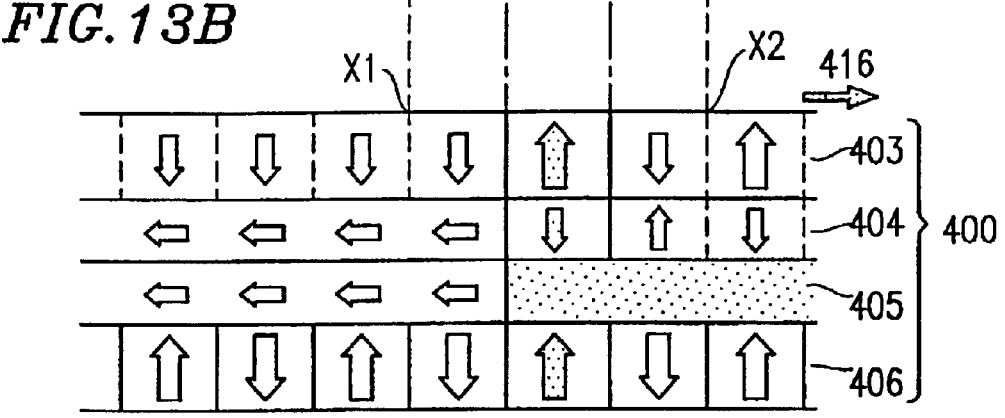
FIG. 13B is a cross-sectional view illustrating a configuration (particularly, the magnetization direction) of magnetic films included in the magneto-optical recording medium according to Example 5 of this invention in a reproducing operation.

FIGS. 13A and 13B are diagrams for explaining the reproduction operation of a magneto-optical recording medium 400 according to Example 5 of this invention. Specifically, FIG. 13A is a plan view illustrating part of a track of the magneto-optical recording medium 400. FIG. 13B is a cross-sectional view illustrating magnetization directions of magnetic films included in the magneto-optical recording medium 400.

The magneto-optical recording medium 400 includes a reproducing layer 403, a reproducing aid layer 404, an intermediate layer 405, and a recording layer 406 which are provided on a substrate (not shown) as shown in the cross-sectional view of FIG. 13B. The intermediate layer 405 included in the structure of Example 5 is made of a magnetic film. An arrow 416 in FIG. 13B indicates a moving direction along a track of the magneto-optical recording medium 400.

When reproducing information, laser light is irradiated along a track in a range between X1 to X2 in FIG. 13B. As shown in the plan view of FIG. 13A, a reproducing light spot 417 is provided. When the laser light is irradiated onto the rotating magneto-optical recording medium 400, the temperature distribution of the magnetic film structure including the reproducing layer 403 is not rotation symmetrical around the center of the circular reproducing light spot 417. Specifically, a region 410 which has been previously irradiated by the reproducing light spot 417 has a high temperature. In Example 5, the intensity of the reproducing laser light is adjusted in such a manner that the temperature of the intermediate layer 405 is greater than or equal to the Curie temperature Tc4 thereof and the reproducing aid layer 404 has a temperature of Tsw1 or higher where it has magnetic anisotropy in a direction perpendicular to the film surface. There is a region 411 outside the high temperature region 410 which has a low temperature less than Tsw1.

The characteristic of Kerr hysteresis loop when the temperature of the reproducing aid layer 404 is changed by changing the intensity of the reproducing laser light is similar to what is described in FIGS. 11A through 11C in association with Example 2. The magnetic anisotropy of the reproducing aid layer 404 in a direction perpendicular to the film surface increases with an increase in the temperature.

The intermediate layer 405 has the magnetic anisotropy in a direction perpendicular to the film surface. The Curie temperature of the intermediate layer 405 is set to a low temperature in a reproducing temperature range which it can reach. When the reproducing aid layer 404 and the intermediate layer 405 having such characteristics are used, a coupling force due to a static magnetic field is generated between the recording magnetic domain 409 of the recording layer 406 and the recording aid layer 404 in the temperature range where the temperature of the reproducing aid layer 404 is greater than or equal to the Curie temperature. As a result, the recording magnetic domain 409 of the recording layer 406 is transcribed onto the reproducing layer 403.

The principle of the reproduction of Example 5 will be described in greater detail below.

The recording layer 406 has a characteristic such that the saturated magnetization increases with an increase in the temperature, similar to Example 1. An information signal is thermomagnetically recorded as the recording magnetic domains 409 onto the recording layer 406. Laser light for reproduction is irradiated onto the rotating magneto-optical recording medium 400 upon reproduction of the information signal. The low temperature region 411 within the laser light spot 417 has a temperature less than Tsw1. The reproducing aid layer 404 and the intermediate layer 405 have magnetic anisotropy in an in-plane direction parallel to the film surface. For this reason, the recording magnetic domain 409 of the recording layer 406 is blocked by the intermediate layer 405 and the reproducing aid layer 404, and is not transcribed onto the reproducing layer 403. The magnetization of the reproducing layer 403 is directed in a single direction due to influence of a surrounding magnetic field.

On the other hand, in the high temperature region 410, the temperature of the reproducing aid layer 404 is increased to Tsw1 or higher. The reproducing aid layer 404 then has large magnetic anisotropy in a direction perpendicular to the film surface. Further, the temperature of the intermediate layer 405 reaches a temperature greater than or equal to the Curie temperature, so that the magnetization of the intermediate layer 405 disappears. A magnetic coupling force due to a static magnetic field is increased between the recording layer 406 and the reproducing aid layer 404 via the intermediate layer 405. In this case, the reproducing aid layer 404 and the reproducing layer 403 are exchange-coupled with each other. The coupling force of the recording layer 406 acting on the reproducing layer 403 is therefore stronger than the shrinking force of a magnetic domain in the reproducing layer 403. As a result, in the region where the temperature is Tsw1 or higher, the recording magnetic domain 409 of the recording layer 406 is transcribed onto the reproducing layer 403 via the intermediate layer 405 and the reproducing aid layer 404. In a portion inside the reproducing light spot 417 corresponding to the low temperature region 411, the reproducing aid layer 404 and the intermediate layer 405 largely block the exchange-coupling force between the recording layer 406 and the reproducing layer 403, as the reproducing aid layer 404 and the intermediate layer 405 have magnetic anisotropy in an in-plane direction parallel to the film surface. The recording magnetic domain 409 of the recording layer 406 is thus masked. As a result, information is read as a reproduced signal only from the recording magnetic domain 409 at a position corresponding to the high temperature region 410.

Thus, in the magneto-optical recording medium 400 of Example 5, although the recording magnetic domain 409 is smaller than the reproducing light spot 417, there occurs substantially no interference by recording magnetic domains 409 ahead of and behind the former recording magnetic domain 409. It is therefore possible to reproduce information stored in high density.

To reproduce information stored in high density, the magneto-optical recording medium 400 of Example 5 needs to be heated with laser light for reproduction so as to obtain a region in which the Curie temperature of the intermediate layer 405 is Tc4 or higher and the reproducing aid region 404 has a temperature of Tsw1 or higher where the magnetic anisotropy in a direction perpendicular to the film surface is dominant.

In the magneto-optical recording medium 400, the reproducing aid layer 404 and the intermediate layer 405 control the magnetic coupling force between the reproducing layer 403 and the recording layer 406. At room temperature, the intermediate layer 405 having the magnetic anisotropy in an in-plane direction parallel to the film surface is used for the purpose of cutting off the magnetic coupling force effectively. Further, composition of magnetic film included in the intermediate layer 405 needs to be designed in such a manner that the Curie temperature Tc4 of the intermediate layer 405 is in a range which the temperature of the intermediate layer 405 heated by the reproducing light spot 417 can reach.

To secure transcription of the recording magnetic domain 409 in the high temperature region 410, Tsw1 and Tc4 each are preferably about 80° C. or higher. The Curie temperature Tc3 of the recording layer 406 is set to about 180° C. to about 300° C. In view of this, Tsw1 and Tc4 are each more preferably about 100° C. to about 250° C. to prevent record destruction. Further, to improve the quality of a reproduced signal, Tsw1 is preferably as high as possible within the above-described allowable temperature range. In view of the above-described points, Tsw1 and Tc4 each are preferably about 130° C. to about 180° C.

For example, in the magneto-optical recording medium 400, Tsw1 is set to about 120° C. The composition of the reproducing layer 403 is $Gd_{22.5}Fe_{66.5}Co_{11}$. The composition of the reproducing aid layer 404 is $Gd_{29}Fe_{67}Co_4$. The composition of the intermediate layer 405 is $Dy_{33}Fe_{67}$. The composition of the recording layer 406 is $Tb_{20}Fe_{65}Co_{15}$.

The intermediate layer 405 can have the low Curie temperature Tc4 by adjusting the above-described composition of DyFe. The intermediate layer 405 may be made of magnetic material including a rare earth-transition metal alloy such as TbFeCr, TbDyFeTi, and GdFeSi to which a non-magnetic element or Al, Ag, Au, or the like is added. Such an intermediate layer 405 can obtain an effect similar to what is described above.

EXAMPLE 6

Next, a magneto-optical recording medium according to Example 6 of this invention will be described with reference to FIGS. 14A and 14B.

Figure 14A:
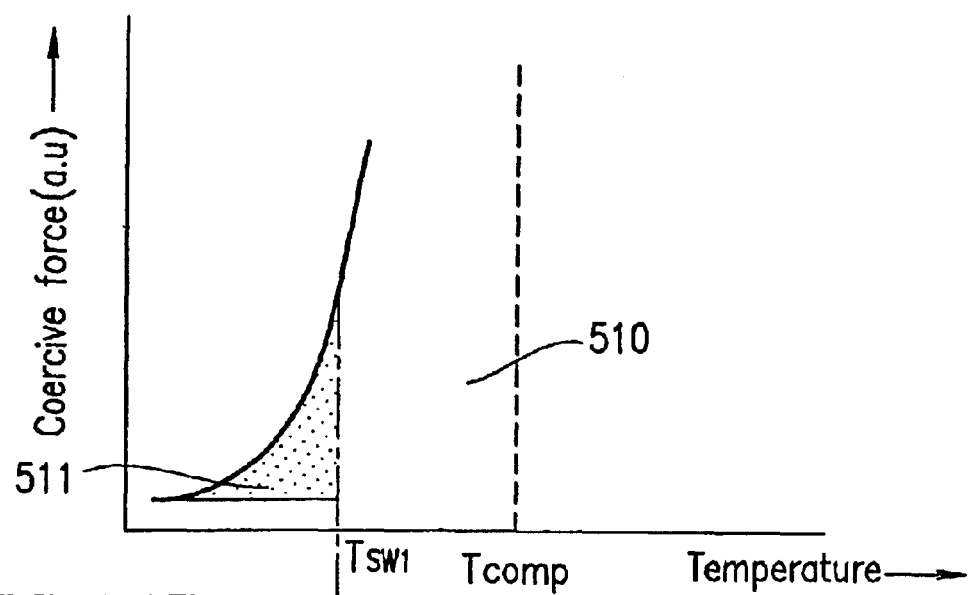
FIG. 14A is a graph showing dependency of a coercive force on temperature in a reproducing operation in a magneto-optical recording medium according to Example 6 of this invention.
Figure 14B:
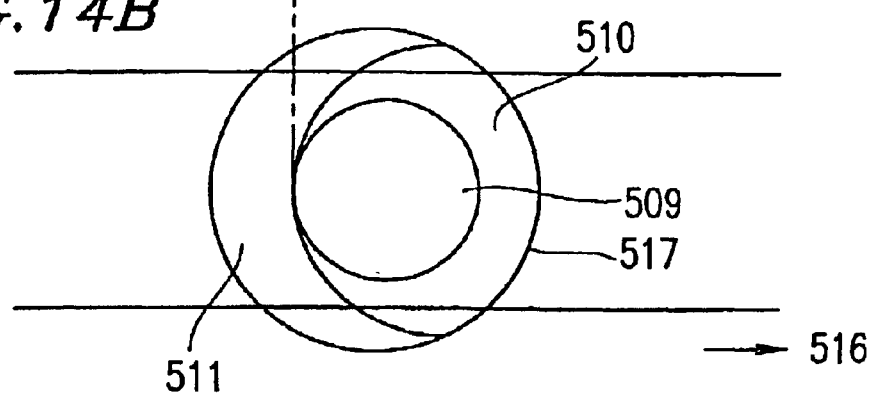
FIG. 14B is a plan view illustrating part of a track of the magneto-optical recording medium according to Example 6 of this invention in a reproducing operation.

FIG. 14A is a graph showing the temperature characteristics of a coercive force of a reproducing aid layer in the magneto-optical recording medium of Example 6. FIG. 14B is a plan view illustrating the vicinity of a reproducing light spot 517 on a track of the magneto-optical recording medium of Example 6. In FIG. 14A, the horizontal axis represents a temperature range of from room temperature to a temperature Tsw1 or higher. The vertical axis represents the coercive force.

The reproducing aid layer in the magneto-optical recording medium of Example 6 forms an in-plane magnetization film in a region 511 having a temperature less than about Tsw1 (where Tsw1 is less than the compensation composition temperature Tcomp). The reproducing aid layer also forms a vertical magnetization film in a region 510 having a temperature of Tsw1 or higher.

When reproducing information, laser light for reproduction is irradiated onto the magneto-optical recording medium, thereby generating the reproducing light spot 517. The temperature distribution of a magnetic film structure including a reproducing layer is not rotation symmetrical around the center of the circular reproducing light spot 517. The temperature distribution is shifted toward a moving direction 516 of the magneto-optical recording medium.

Assume that a recording magnetic domain 509 is positioned at the center of the reproducing light spot 517. When the magneto-optical recording medium is moved (rotated) toward the arrow 516, the region 510 having a temperature of Tsw1 or higher is shifted to the right side of the center of the reproducing light spot 517. Accordingly, the region 511 having a temperature less than Tsw1 is shifted to the left side of the reproducing light spot 517.

As described above, the reproducing aid layer forms a vertical magnetization film in the region 510 having a temperature of Tsw1 or higher as shown in FIG. 14A. As described in the foregoing Examples, the reproducing aid layer interacts with the recording layer via the intermediate layer made of a non-magnetic film. For this reason, in the region 510, there occurs coupling due to a static magnetic field between the reproducing aid layer and the recording layer, resulting in transcription of the recording magnetic domain 509. On the other hand, in the 511 having a temperature less than Tsw1, the reproducing aid layer forms the in-plane magnetization film, so that the magnetic coupling force of the recording layer cannot interact with the reproducing aid layer. As a result, the shrinking force of the recording magnetic domain 509 of the reproducing layer is stronger than the coupling force due to a static magnetic field from the recording layer.

This causes masking of information stored in the recording magnetic domain 509 at a position corresponding to the region 511 having a temperature less than Tsw1 within the reproducing light spot 517. As a result, only information in the recording magnetic domain 509 at a position corresponding to the high temperature region 510 interacts with the reproducing aid layer by means of the coupling force due to a static magnetic field. The information is transcribed onto the reproducing layer which is exchange-coupled with the reproducing aid layer. Only the information is then read as a reproduced signal.

As described above, in the magneto-optical recording medium of Example 6, although the recording magnetic domain 509 is smaller than the reproducing light spot 517, there occurs substantially no interference by recording magnetic domains 509 ahead of and behind the former recording magnetic domain 509. It is therefore possible to reproduce information stored in high density.

To reproduce information stored in high density, the magneto-optical recording medium of Example 6 needs to be heated with laser light for reproduction so as to obtain a region having a temperature of Tsw1 or higher.

The Curie point Tc3 of the recording layer of the magneto-optical recording medium of Example 6 is set to about 250° C. in order to hold the stable recording magnetic domain 509 which has been thermomagnetically recorded.

Magnetic film included in each layer of the magneto-optical recording medium of Example 6 can be easily produced from a rare earth metal-transition metal amorphous alloy which provides easy handling in fabrication and easy control of a magnetic characteristic, similar to the foregoing Examples.

The composition of the reproducing aid layer used in the magneto-optical recording medium of Example 6 needs to satisfy the following conditions in order to obtain the operation in a temperature range of Tsw1 or higher.

During operation of a disk drive, the temperature inside the apparatus may be increased up to about 60° C. by taking into account variation in environmental temperature. To secure power required for reproduction in such situation, Tsw1 is preferably set to at least 80° C. or higher.

On the other hand, when Tsw1 is higher than the Curie temperature Tc3 of the recording layer, the recording magnetic domain 509 of the recording layer disappears or is destroyed upon reproduction. Therefore, Tsw1 needs to be set to a temperature less than Tc3. Typically, the Curie temperature Tc3 of the recording layer is designed so that the recording layer can have a sufficient recording sensitivity to record using semiconductor laser light. Preferably, Tc3 is in a range of from about 180° C. to about 300° C. Further, the Curie temperature Tsw1 of the reproducing layer needs to be set to Tsw1 or higher in order to hold magnetization of a temperature region having a temperature of Tsw1 or higher.

In view of what is described above, Tsw1 is preferably about 100° C. to about 250° C. Tsw1 is a temperature at which the reproducing layer changes from the in-plane magnetization film to the vertical magnetization film. In the magneto-optical recording layer of Example 6, the reproducing aid layer contacts with the recording layer via the intermediate layer which is a non-magnetic layer. When the non-magnetic layer (intermediate layer) has an appropriate structure and material so that the thermal diffusion coefficient of the intermediate layer is set to an appropriate value, the above-described Tsw1 can be set to a temperature in a wider range.

Examples of the material included in the reproducing aid layer satisfying the above-described conditions include GdFeCo, GdFe, GdCo, and DyFe. Specifically, when the reproducing aid layer is made of GdFeCo, the Gd molar fraction is preferably about 20% to about 28%.

For example, in the magneto-optical recording medium of Example 6, Tsw1 is set to about 100° C. The compensation composition temperature Tcomp is set to about 260° C. The reproducing aid layer is made of a GdFeCo film having a Gd molar fraction of about 27.7% and a Co/Fe ratio of about 46%.

EXAMPLE 7

Next, a magneto-optical recording medium according to Example 7 of this invention will be described with reference to FIGS. 15A and 15B.

Figure 15A:
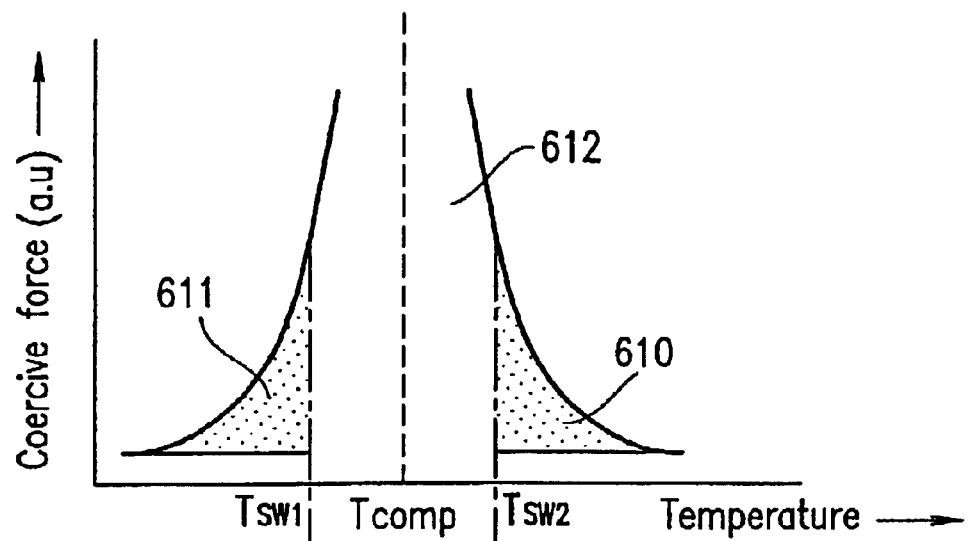
FIG. 15A is a graph showing dependency of a coercive force on temperature in a reproducing operation in a magneto-optical recording medium according to Example 7 of this invention.
Figure 15B:
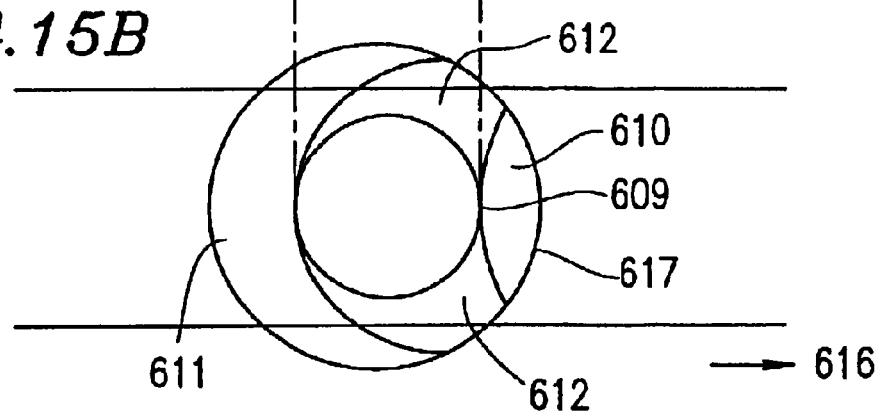
FIG. 15B is a plan view illustrating part of a track of the magneto-optical recording medium according to Example 7 of this invention in a reproducing operation.

FIG. 15A is a graph showing the temperature characteristics of a coercive force of a reproducing aid layer in the magneto-optical recording medium of Example 7. FIG. 15B is a plan view illustrating the vicinity of a reproducing light spot 617 on a track of the magneto-optical recording medium of Example 7. In FIG. 15A, the horizontal axis represents a temperature range of from room temperature to a temperature Tsw2 or higher. The vertical axis represents the coercive force.

The reproducing aid layer in the magneto-optical recording medium of Example 7 forms an in-plane magnetization film in a region 611 having a temperature less than Tsw1 and a region 610 having a temperature of Tsw2 or higher. The reproducing aid layer also forms a vertical magnetization film in a region 612 having a temperature which is greater than or equal to Tsw1 and less than Tsw2 higher and which is around the compensation composition temperature Tcomp. An intermediate layer is provided between the reproducing aid layer and the recording layer.

When reproducing information, laser light for reproduction is irradiated onto the magneto-optical recording medium, thereby generating the reproducing light spot 617. The temperature distribution of a multi-magnetic film structure including a reproducing layer is not rotation symmetrical around the center of the circular reproducing light spot 617. The temperature distribution is shifted toward a moving direction 616 of the magneto-optical recording medium. When the magneto-optical recording medium is moved (rotated) toward the arrow 616, there are regions 611, 612, and 610 within the reproducing light spot 617. The region 611 has a temperature less than Tsw1. The region 612 has a temperature greater than or equal to Tsw1 and less than Tsw2. The region 610 has a temperature of Tsw2 or higher.

As described above referring to FIG. 15A, the reproducing aid layer forms the in-plane magnetization film in the region 611 having a temperature less than Tsw1 and the region 610 having a temperature of Tsw2 or higher. In these regions, a magnetic coupling force due to a static magnetic field between the reproducing aid layer and the recording layer does not interact with a recording magnetic domain of the recording layer. The regions 611 and 610 are thus not affected by the recording magnetic domain. As a result, the shrinking force of a recording magnetic domain 609 of the reproducing layer is stronger than a magnetic coupling force. This causes masking of information stored in the recording magnetic domain 609. On the other hand, in the region 612 having a temperature greater than or equal to Tsw1 and less than Tsw2, the reproducing aid layer is changed to the vertical magnetization film so that a magnetic coupling force due to a static magnetic field from the recording layer sufficiently influences the reproducing aid layer. An exchange-coupling force is then generated between the reproducing layer and the reproducing aid layer, so that the recording magnetic domain 609 is transcribed onto the reproducing layer.

To reproduce information stored in high density, the magneto-optical recording medium of Example 7 needs to be heated with laser light for reproduction so as to obtain a region having a temperature of Tsw2 or higher. In this region, the reproducing aid layer forms the in-plane magnetization film. In this case, the region 610 having a temperature of Tsw2 or higher is formed within the reproducing light spot 617. In the region 610, the recording magnetic domain is thus masked. This makes it possible to further reduce a region in which the recording magnetic domain 609 is transcribed onto the reproducing layer so that reproduction can be performed, as compared with when only the low temperature region 611 is masked. As a result, information is stored and read in higher resolution and density in Example 7 than in Example 6.

In addition to the conditions described in Example 6, the reproducing aid layer of the magneto-optical recording medium of Example 6 needs the following conditions. In order to perform transcription in the temperature region 612 having a temperature greater than equal to Tsw1 and less than Tsw2 and to prevent the recording magnetic domain 609 from disappearing and being destroyed, Tsw2<Tsw1 and Tsw2<Tc3 need to be satisfied where Tsw2 is the Curie temperature of the reproducing aid layer, Tc1 is the Curie temperature of the reproducing layer, and Tc3 is the Curie temperature of the recording layer.

To secure transcription of the recording magnetic domain 609 in the temperature region 612, a difference in temperature between Tsw1 and Tsw2 needs to be at least about 10° C. or higher. For this reason, when Tsw1 is about 80° C. or higher, Tsw2 is preferably at least 90° C. or higher. Tc3 is set to about 180° C. to about 300° C. In view of this, Tsw1 and Tsw2 are preferably about 100° C. to about 250° C. and about 110° C. to about 260° C., respectively, to prevent the recording magnetic domain 609 from disappearing and being destroyed. Further, to improve the quality of a reproduced signal, Tsw1 is preferably as high as possible within the above-described allowable temperature range. In view of the above-described points, Tsw1 and Tsw2 are preferably about 130° C. to about 180° C. and about 140° C. to about 220° C., respectively.

Examples of the material included in the reproducing aid layer satisfying the above-described conditions include GdFeCo, GdFe, GdCo, and DyFe. Specifically, the reproducing aid layer is made of the GdFeCo from Example 6. The compensation composition temperature Tcomp is mainly determined by the Gd molar fraction. When the Gd molar fraction is preferably about 20% to about 28%, the compensation composition temperature Tcomp is set to about 50° C. to about 280° C. A temperature at which the reproducing aid layer changes from the in-plane magnetization film to the vertical magnetization film is determined by a Fe/Co molar fraction ratio. The smaller the Fe/Co molar fraction ratio, i.e., when the Fe molar fraction is decreased, the higher temperature at which the reproducing aid layer changes to the vertical magnetization film.

For example, in the magneto-optical recording medium of Example 7, Tsw1 is set to about 130° C. Tsw2 is set to about 180° C. The reproducing aid layer is made of $Gd_{24}Fe_{61}Co_{15}$.

In Example 6, when the temperature of the reproducing aid layer is close to the compensation composition temperature Tcomp, saturated magnetization is reduced. A magnetic coupling force due to a static magnetic field from the recording layer is therefore unlikely to occur. Though sufficient transcription is performed in a region having a temperature of around Tsw1 or Tsw2. A magnetic domain can thus be transcribed onto the reproducing layer.

EXAMPLE 8

Figure 16A:
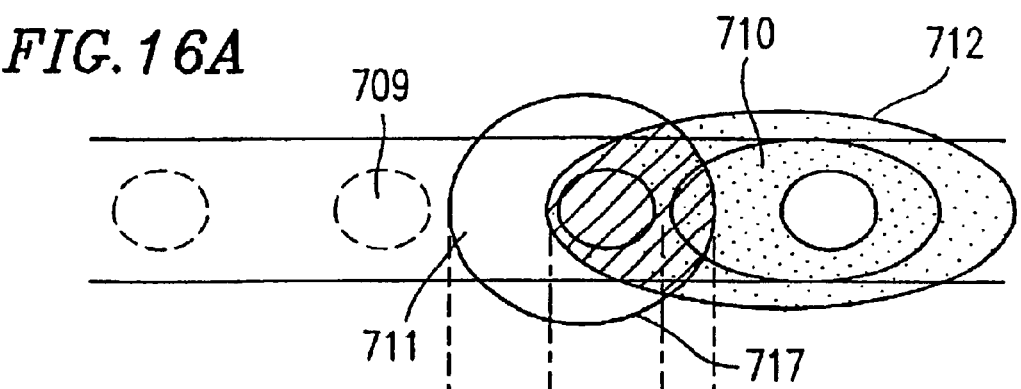
FIG. 16A is a plan view illustrating part of a track of a magneto-optical recording medium according to Example 8 of this invention in a reproducing operation.
Figure 16B:
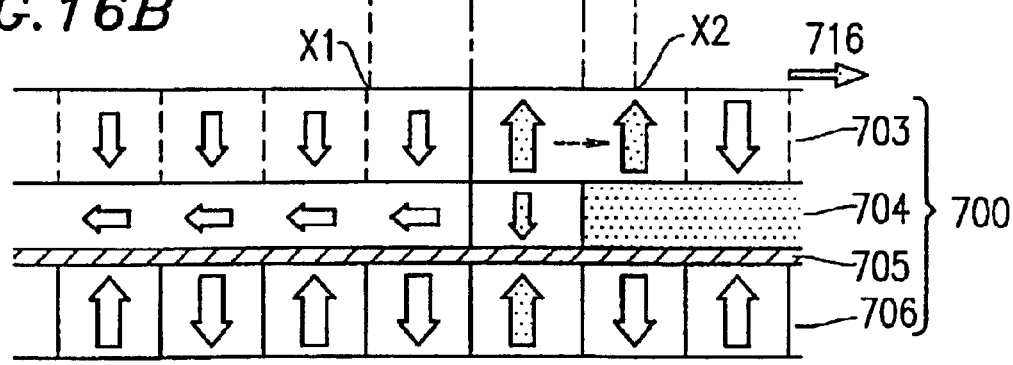
FIG. 16B is a cross-sectional view illustrating a configuration (particularly, the magnetization direction) of magnetic films included in the magneto-optical recording medium according to Example 8 of this invention in a reproducing operation.

FIGS. 16A and 16B are diagrams for explaining the reproduction operation of a magneto-optical recording medium 700 according to Example 8 of this invention. Specifically, FIG. 16A is a plan view illustrating part of a track of the magneto-optical recording medium 700. FIG. 16B is a cross-sectional view illustrating magnetization directions of magnetic films included in the magneto-optical recording medium 700.

The magneto-optical recording medium 700 includes a reproducing layer 703, a reproducing aid layer 704, an intermediate layer 705, and a recording layer 706 which are provided on a substrate (not shown) as shown in the cross-sectional view of FIG. 16B. An arrow 716 in FIG. 16B indicates a moving direction along a track of the magneto-optical recording medium 700.

When reproducing information, laser light is irradiated along a track in a range between X1 to X2 in FIG. 16B. As shown in the plan view of FIG. 16A, a reproducing light spot 717 is provided. When the laser light is irradiated onto the rotating magneto-optical recording medium 700, the temperature distribution of the magnetic film structure including the reproducing layer 703 is not rotation symmetrical around the center of the circular reproducing light spot 717. Specifically, the center of the temperature distribution is shifted toward the moving direction 716 of the rotating magneto-optical recording medium 700. A region 710 which has been previously irradiated by the reproducing light spot 717 has a high temperature. In Example 8, the intensity of the reproducing laser light is adjusted in such a manner that the temperature of the reproducing aid layer 704 is greater than or equal to Tc2 and Tsw1. Where Tc2 is the Curie temperature Tc2 of the reproducing aid layer 704 and Tsw1 is a temperature at which the reproducing aid layer 704 has magnetic anisotropy in a direction perpendicular to the film surface. There are regions 711 and 712 outside the high temperature region 710 which have a low temperature less than Tsw1 and an intermediate temperature greater than or equal to Tsw1 and less than Tc2, respectively.

The characteristic of Kerr hysteresis loop when the temperature of the reproducing aid layer 704 is changed by changing the intensity of the reproducing laser light is similar to what is described in FIGS. 11A through 11C in association with Example 2. The magnetic anisotropy of the reproducing aid layer 704 in a direction perpendicular to the film surface increases with an increase in the temperature. For this reason, a recording magnetic domain 709 of the recording layer 706 is transcribed onto the reproducing aid layer 704.

The principle of the reproduction of Example 8 will be described in greater detail below.

An information signal is thermomagnetically recorded as the recording magnetic domains 709 onto the recording layer 706. Laser light for reproduction is irradiated onto the rotating magneto-optical recording medium 700 upon reproduction of the information signal. The low temperature region 711 has a temperature less than Tsw1. The reproducing aid layer 704 has magnetic anisotropy in an in-plane direction parallel to the film surface. For this reason, the recording magnetic domain 709 of the recording layer 706 is blocked by the intermediate layer 705 and the reproducing aid layer 704 and is not transcribed onto the reproducing layer 703.

On the other hand, in the high temperature region 710, the temperature of the reproducing aid layer 704 is increased to Tc2 or higher, so that the magnetization disappears. There is substantially no interaction due to a static magnetic field between the recording layer 706 and the reproducing aid layer 704. The coupling force between the recording layer 706 and the reproducing layer 703 due to a static magnetic field is weak. Information on the recording layer 706 is not transcribed onto the reproducing layer 703.

In the intermediate temperature region 712 having a temperature between or equal to Tsw1 and Tc2, the magnetic anisotropy in a direction perpendicular to the film surface is increased and the magnetization of the recording layer 705 is maximized, so that a strong magnetic coupling force is generated between the recording layer 706 and the reproducing aid layer 704 via the intermediate layer 705 due to a static magnetic field. In this case, the reproducing aid layer 704 and the reproducing layer 703 are exchange-coupled with each other. The coupling force of the recording layer 706 acting on the reproducing layer 703 is therefore stronger than the shrinking force of a magnetic domain in the reproducing layer 703. As a result, the recording magnetic domain 709 of the recording layer 706 is transcribed onto the reproducing layer 703 via the intermediate layer 705 and the reproducing aid layer 704.

The portion of the reproducing light spot 717 corresponding to the low temperature region 711 has a low level of magnetic interaction between the recording layer 706 and the reproducing aid layer 704. The recording magnetic domain 709 of the recording layer 706 is thus masked. In the portion of the reproducing light spot 717 corresponding to the high temperature region 710, the reproducing aid layer 704 has a temperature greater than or equal to the Curie temperature. The reproducing aid layer 704 is not affected so much by a magnetic field caused by magnetization of the recording magnetic domain 709 of the recording layer 706.

Here the reproducing layer 703 is made of magnetic film having a characteristic such that a magnetic domain wall is moved in a direction indicated by a dashed line in FIG. 16B due to the temperature gradient within the light spot. For this reason, when a magnetic domain does not have a size greater than or equal to a predetermined size, the magnetic domain is not stable. Consequently, a magnetic domain, which is transcribed from the recording layer 706 to the reproducing layer 703 in the intermediate region having a temperature greater than or equal to Tsw1 and less than Tc2, has a magnetic domain wall shifted toward the high temperature region side. Such a magnetic domain is enlarged in the light spot 717 during reproduction.

As a result, information is read as a reproduced signal only from the recording magnetic domain 709 at a position corresponding to the intermediate temperature region 712.

As described above, in the magneto-optical recording medium 700 of Example 8, the recording magnetic domain 709 recorded in the recording layer 706 is not read at positions corresponding to the low temperature region 711 and the high temperature region 710 within the reproducing light spot 717. As a result, information is read as a reproduced signal only from the recording magnetic domain 709 at a position corresponding to the intermediate temperature region 712. In this case, whereas the low temperature region 711 within the reproducing light spot 717 is masked, the high temperature region 710 has the reproducing aid layer 704 having a temperature greater than or equal to the Curie temperature. In the reproducing aid layer 704 having such a condition, the magnetic domain wall is easily moved. For this reason, transcription of the recording magnetic domain 709 recorded in the recording layer 706 is performed only at a position corresponding to the intermediate region 712. The transcribed magnetic domain is however enlarged further into the high temperature region during reproduction. As a result, a magnetic domain which is larger than the recording magnetic domain 709 of the recording layer 706 is formed in the reproducing layer 703, and is then read as a reproduced signal.

Thus, in the magneto-optical recording medium 700 of Example 8, although the recording magnetic domain 709 is smaller when compared with that of the magneto-optical recording mediums of the foregoing Examples, there occurs substantially no interference by recording magnetic domains 709 ahead of and behind the former recording magnetic domain 709. Further, the amount of a signal can be increased during reproduction. It is therefore possible to reproduce information stored in higher density.

To reproduce information stored in high density, the magneto-optical recording medium 700 of Example 8 needs to be heated with laser light for reproduction so as to obtain a region having a temperature greater than or equal to the Curie temperature Tc2 of the reproducing aid region 704.

In the magneto-optical recording medium 700, the reproducing aid layer 704 controls the magnetic coupling force between the reproducing layer 703 and the recording layer 706. Under certain conditions, the reproducing aid layer 704 is also used for the purpose of cutting off the magnetic coupling force effectively so that the magnetic domain wall can be smoothly moved in the reproducing layer 703. Therefore, as to the composition of magnetic film included in each layer of the magneto-optical recording medium 700, the Curie temperature Tc2 of the reproducing aid layer 704 needs to satisfy Tsw1<Tc2. In order to perform transcription in the intermediate temperature region 712 having a temperature greater than equal to Tsw1 and less than Tc2 and to prevent record destruction, Tc2<Tsw1 and Tc2<Tc3 need to be satisfied where Tc2 is the Curie temperature of the reproducing aid layer 704, Tsw1 is the Curie temperature of the reproducing layer 703, and Tc3 is the Curie temperature of the recording layer 706.

To secure transcription of the recording magnetic domain 709 in the intermediate temperature region 712, a difference in temperature between Tsw1 and Tc2 needs to be at least about 10° C. or higher. For this reason, when Tsw1 is about 80° C. or higher, Tc2 is preferably at least 90° C. or higher. Further, more preferably, the Curie temperature Tc3 of the recording layer 706 is set to about 180° C. to about 300° C. In view of this, Tsw1 and Tc2 are preferably about 100° C. to about 250° C. and about 110° C. to about 260° C., respectively, to prevent record destruction. Further, to improve the quality of a reproduced signal, Tsw1 is preferably as high as possible within the above-described allowable temperature range. In view of the above-described points, Tsw1 and Tc2 are preferably about 130° C. to about 180° C. and about 150° C. to about 220° C., respectively.

For example, in the magneto-optical recording medium 700, Tsw1 and Tc2 are set to about 150° C. and about 210° C., respectively. The composition of the reproducing layer 703 is $Gd_{21}Fe_{65}Co_{11}Cr_3$. The composition of the reproducing aid layer 704 is $Gd_{27}Fe_{68.5}Co_{4.5}$. The composition of the recording layer 706 is $Tb_{20}Fe_{64}Co_{16}$.

The intermediate layer 705 is made of a non-magnetic material similar to Example 1. Alternatively, the intermediate layer 705 may be made of a magnetic material similar to Example 5.

To obtain the smooth movement of the magnetic domain wall in the reproducing layer 703, magnetization between each track may be reduced or eliminated so as to separate the recording tracks from each other.

EXAMPLE 9

Figure 17A:
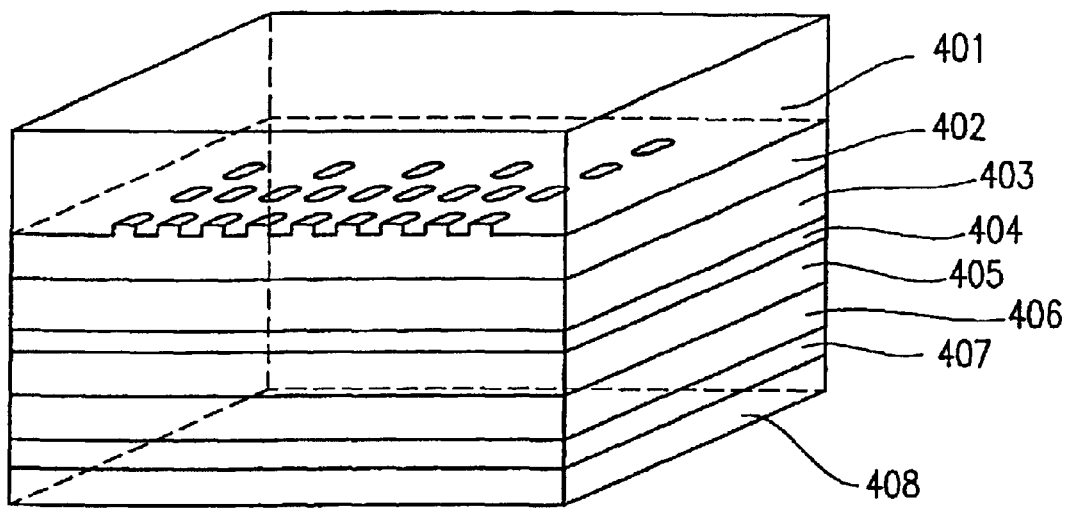
FIG. 17A is a diagram illustrating a configuration of a magneto-optical recording medium according to Example 9 of this invention.
Figure 17B:
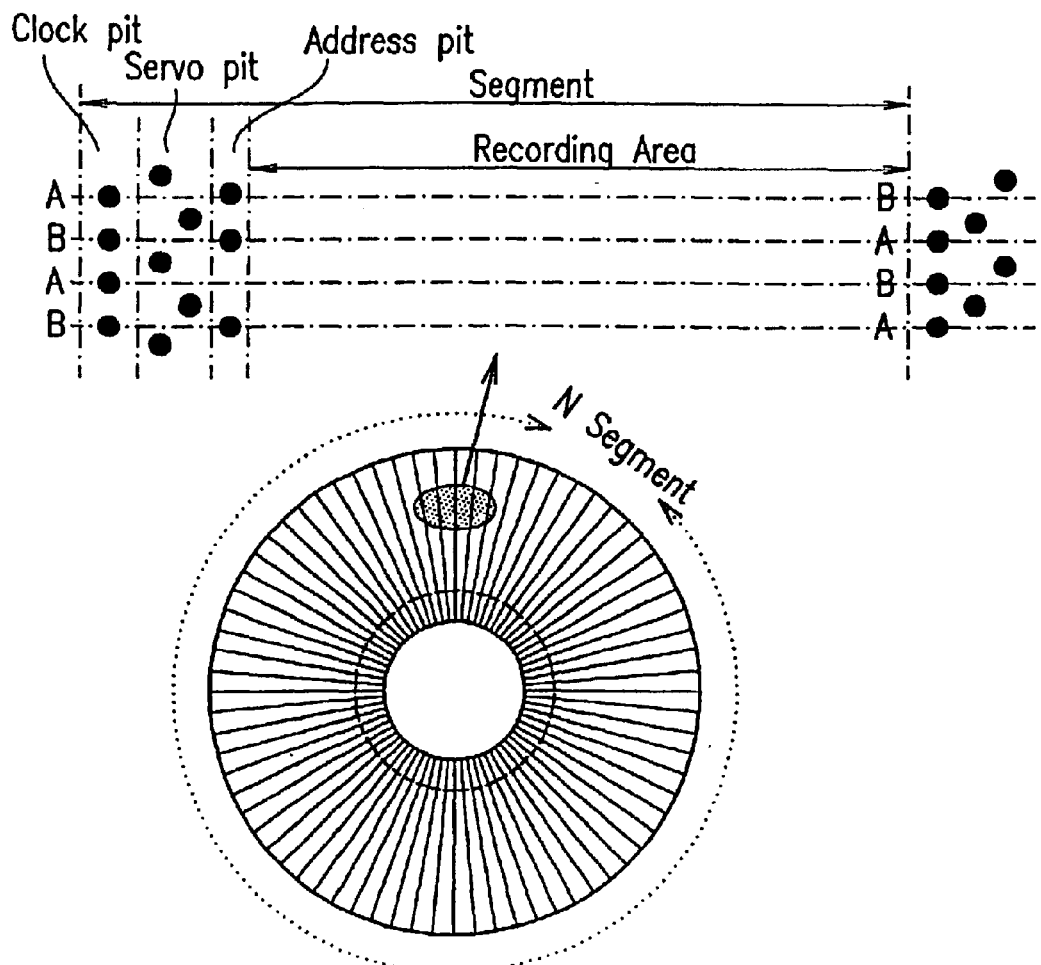
FIG. 17B is a diagram illustrating a structure of the physical format of the magneto-optical recording medium according to Example 9 of this invention.

A magneto-optical recording medium according to Example 9 of this invention will be described below with reference to FIGS. 17A and 17B. This magneto-optical recording medium has a multi-film structure as shown in FIGS. 17A and 17B. The reproduction operation of the magneto-optical recording medium is similar to that of Example 5, so that FIG. 13 also will be discussed.

A disk substrate of Example 9 has discrete prepits. A signal recording surface of the disk has a flat structure. The prepits include clock pits, address pits, and wobbled servo pits. Tracking control is performed using the servo pits. Address detection is performed using the address pits. In this way, an information signal is written or read from the disk.

The magneto-optical recording medium of Example 9 has a multi-layer structure as shown a cross-sectional view in FIG. 17A. The magneto-optical recording medium of Example 9 has a three-layer recording film in a structure and physical format structure as shown in FIGS. 17A and 17B.

In Example 9, targets of B-doped Si, and Gd, Dy, Tb, Fe, and Co, respectively, are placed in a direct current magnetron sputtering apparatus. A transparent polycarbonate substrate 401 is fixed on a substrate holder. Prepits have been formed on the substrate 401. Thereafter, a chamber is evacuated by a cryopump to a high vacuum of about $5 \times 10^{-5}$ Pa or less.

While keeping the evacuation, Ar gas is introduced into the chamber to have a pressure of about 0.6 Pa. A SiN layer is formed to a thickness of about 80 nm as a dielectric layer 402 on the substrate 401 which is being rotated. The dielectric layer 402 has an interference effect. Following to this, a GdCo layer, a DyFe layer, and a TbFeCo layer are successively formed to a thickness of about 30 nm, about 10 nm, and about 40 nm, respectively, on the SiN layer. The GdCo layer is a first magnetic film, serving as a reproducing layer 403. The DyFe layer is a second magnetic film, serving as an intermediate layer 405. The TbFeCo layer is a third magnetic film, serving as a recording layer 406.

Finally, a SiN layer is formed to a thickness of about 80 nm as a protecting layer on the resultant structure. In the formation of this SiN layer, $N_2$ gas is introduced into the chamber in addition to the Ar gas. The SiN layer is formed by direct current reactive sputtering in which a pulse voltage having the opposite polarity is convoluted. Each magnetic layer is formed by adjusting power applied to each target of Gd, Dy, Tb, Fe, or Co. The power is supplied from a direct current power source.

The composition of each magnetic layer is adjusted in such a manner that all compensation composition temperatures are close to a reproducing temperature. The Curie temperatures of the reproducing layer 403, the intermediate layer 405, and the recording layer 406 are set to about 300° C., about 140° C., and about 270° C., respectively. The coercive force of the reproducing layer 403 is designed to be smaller than a force of moving a magnetic domain wall in the reproducing layer 403, in a temperature range of from a reproducing transcription temperature to the Curie temperature of the recording layer 406.

In this medium, as shown in the cross-sectional view of FIG. 13B, the dielectric layer 402, the magnetic layers, and the dielectric protecting layer 407 are provided on the substrate. The depth of the pits on the substrate is about 100 nm. As shown in FIGS. 17A and 17B, the prepits are discretely arranged in each segment. A region where a signal is recorded has a flat structure. For this reason, the multi-layer magnetic structure has substantially no steps which would exit when a guide groove or the like is provided. When a magnetic domain of the recording layer 406 is transcribed onto the reproducing layer 403, the magnetic domain wall can be smoothly moved in the reproducing layer 403. A magnetic domain is transcribed to be formed in a large portion of the light spot for detecting a signal. Consequently, a difference in characteristic between a land portion and a groove portion is small. There is less unevenness of the magnetic film at an interface portion with a groove wall. There is a small change in mobility in a track direction. These features are obtained in Example 9, as is different from when a guide groove is provided in the structure. The magnetic domain wall is easily moved when the recording magnetic domain is transcribed and formed in the reproducing layer, resulting in formation of a magnetic domain in the reproducing layer.

Recording and reproducing characteristics were measured for the magneto-optical recording medium thus obtained.

A recording and reproducing apparatus used in the measurement of the recording and reproducing characteristics has an optical system structure similar to a typical magneto-optical disk recording and reproducing apparatus. A laser light source for recording and reproduction has a wavelength of about 660 nm and an NA of about 0.60. The laser light source is arranged to supply P-polarized light onto a recording medium.

The use of such an optical system allows formation of temperature gradient in a spot region for recording and reproduction on a recording surface of the rotating magneto-optical recording medium. Therefore, a reduced signal can be detected under the optical limitation of the light spot when the temperature is greater than or equal to a switching temperature of Ts.

The laser for recording and reproduction had a pulse light having a duty of about 50% and a laser power of about 9 mW. A magneto-optical recording medium was subjected to a magnetic field which is modulated by ±150 Oe while being irradiated by the pulse light. The magneto-optical recording medium was heated to a temperature greater than or equal to the Curie temperature of the recording layer. Thereafter, in a cooling process, a pattern was formed in which upward magnetization and downward magnetization are alternated in accordance with the modulated magnetic field. The linear velocity of the magneto-optical recording medium was about 3.5 m/sec.

The modulating frequency of the recording magnetic field ranged from about 0.8 to about 17 MHz. A pattern having a mark length range of about 2.2 to 0.1 μm could be recorded.

Figure 19:
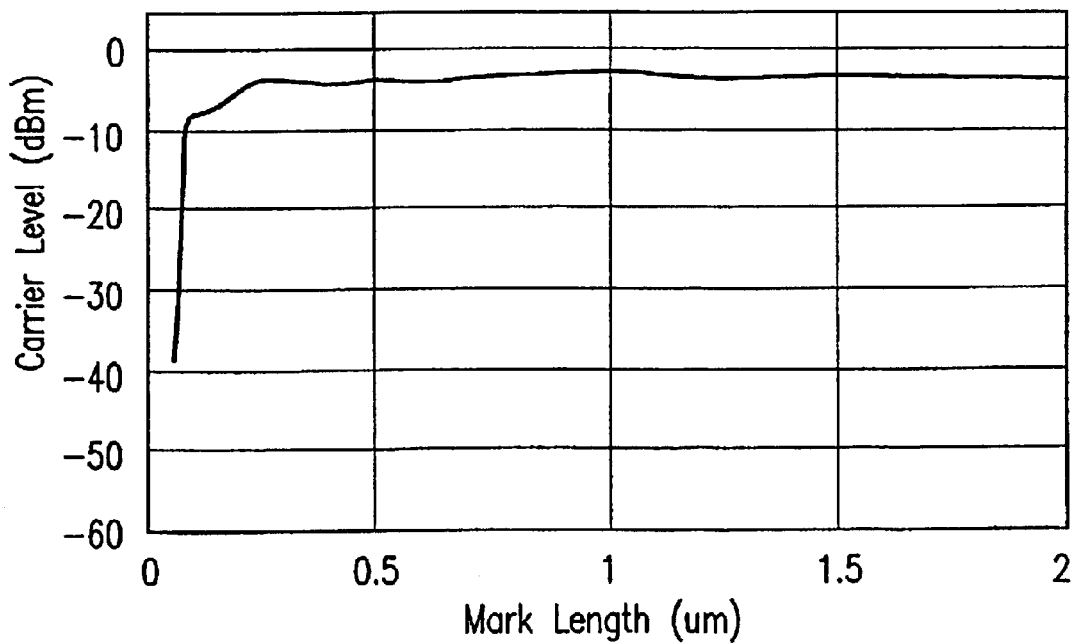
FIG. 19 is a graph showing dependency of a carrier level on mark length when reproducing a signal in Example 9.

The laser for recording and reproduction had a laser power of about 1.8 mW upon reproduction. Under this condition, C/N was measured for each mark length pattern. Results of the measurement are shown in FIG. 19. In this case, a temperature distribution is formed on the medium surface.

As shown in FIG. 19, according to the reproduction method of this invention, when the mark length is decreased, the inversion of the magnetization of the spot for reproduction can be detected. A signal having a period smaller than or equal to the diffraction limit of light can be reproduced. CNR substantially does not depend on the mark length.

Figure 18:
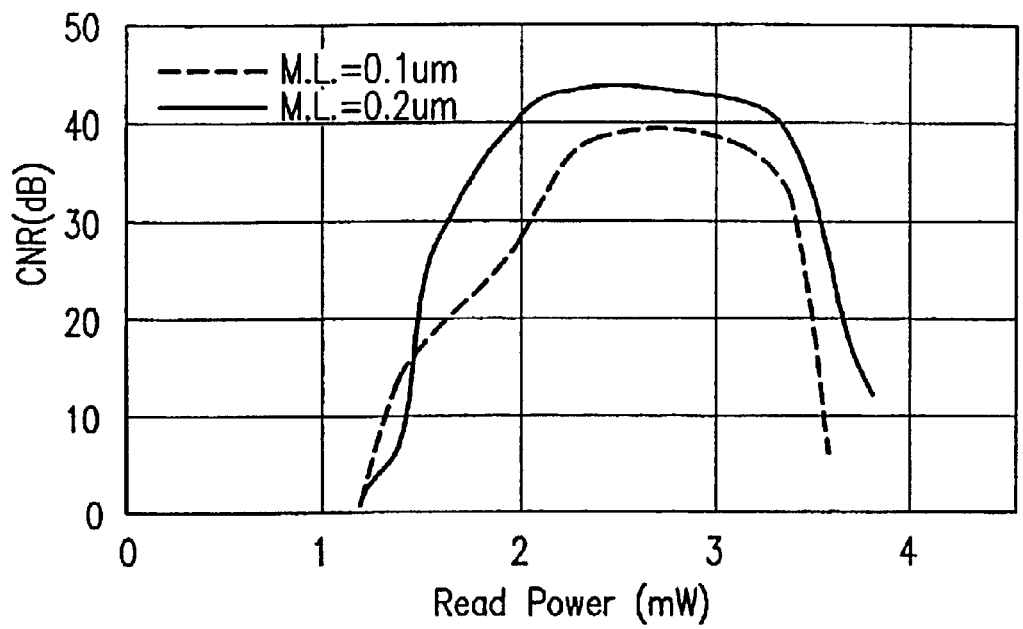
FIG. 18 is a graph showing a signal versus laser power characteristics when reproducing a signal in Example 9.

In FIG. 18, the signal versus reproducing power characteristics were obtained by measuring CNR by changing the reproducing power. As can be seen from FIG. 18, a range in which CNR is decreased by about 1 dB can be secured by about ±10% or greater.

As can be seen from the measurement results, CNR was about 42.5 dB when the mark length was about 0.2 μm. CNR was about 39 dB even when the mark length was about 0.1 μm. The amplitude of a reproduced signal was increased and the transcribed magnetic domain was enlarged as compared with a conventional method using magnetic super-resolution.

EXAMPLE 10

A magneto-optical recording medium according to Example 10 of this invention will be described below. This magneto-optical recording medium has a multi-film structure as shown in FIGS. 17A and 17B, similar to Example 9. Similarly, a disk substrate of Example 10 has discrete prepits. A signal recording surface of the disk has a flat structure.

In Example 10, targets of B-doped Si, and Gd, Tb, Fe, Co and Cr, respectively, are placed in a direct current magnetron sputtering apparatus. A transparent polycarbonate substrate 401 is fixed on a substrate holder. Prepits have been formed on the substrate 401 for detecting a tracking guide and an address signal. Thereafter, a chamber is evacuated by a cryopump to a high vacuum of about $5 \times 10^{-5}$ Pa or less.

While keeping the evacuation, Ar gas is introduced into the chamber to have a pressure of about 0.6 Pa. A SiN layer is formed to a thickness of about 80 nm as a dielectric layer 402 on the substrate 401 which is being rotated. The dielectric layer 402 has an interference effect. Following to this, a GdCoCr layer, a GdFeCr layer, a TbFeCr layer, a TbFeCo layer are successively formed to a thickness of about 30 nm, about 30 nm, about 10 nm, and about 40 nm, respectively, on the SiN layer. The GdCoCr layer is a first magnetic film, serving as a reproducing layer 403. The GdFeCr layer is a magnetic film, serving as a movement controlling layer 404. The TbFeCr layer is a second magnetic film, serving as an intermediate layer 405. The TbFeCo layer is a third magnetic film, serving as a reording layer 406. Finally, a SiN layer is formed to a thickness of about 80 nm as a protecting layer on the resultant structure. In the formation of this SiN layer, $N_2$ gas is introduced into the chamber in addition to the Ar gas. The SiN layer is formed by direct current reactive sputtering in which a pulse voltage having the opposite polarity is convoluted. Each magnetic layer is formed by applying direct current power to each target of Gd, Tb, Fe, Co or Cr.

The composition of each magnetic layer is adjusted in such a manner that all compensation composition temperatures are close to a reproducing temperature. The Curie temperatures of the reproducing layer 403, the movement controlling layer 404, the intermediate layer 405, and the recording layer 406 are set to about 300° C., about 170° C., about 130° C., and about 290° C., respectively. The coercive force of the reproducing layer 403 is designed to be smaller than a transcription magnetic field, in a temperature range from a reproducing start temperature to the Curie temperature of the recording layer 406. The magneto-optical recording medium of Example 10 has a cross-sectional structure as illustrated in FIG. 13, similar to Example 9.

The movement controlling layer 404 is a magnetic layer for controlling the movement of a magnetic domain wall in the reproducing layer 403. In Example 10, the composition of the movement controlling layer 404 is designed to obtain a rare earth element sub-lattice magnetization dominant property at room temperature. This is achieved by adjusting the Gd molar fractions of GdFeCr and the amount of added Cr. The movement of the magnetic domain wall in the transcribed magnetic domain, which is stable regardless of the mark length, can be obtained by setting the Curie temperature to about 170° C. When the movement controlling layer 404 has a composition such that a compensation composition temperature is smaller than or equal to the Curie temperature, the movement controlling layer 404 has the large temperature dependency of magnetic domain wall energy around the Curie temperature. It is therefore believed that a greater force can be supplied to the magnetic domain wall due to temperature gradient.

Recording and reproduction characteristics of the thus-obtained magneto-optical recording medium was measured in a way similar to that in Example 9.

The laser light upon recording was a pulse light having a duty of about 30% and a laser power of about 10 mW. The magneto-optical recording medium was subjected to a magnetic field which is modulated by ±200 Oe while being irradiated by the pulse light. The magneto-optical recording medium was heated to a temperature greater than or equal to the Curie temperature of the recording layer. Thereafter, in a cooling process, a pattern is formed in which upward magnetization and downward magnetization are alternated in accordance with the modulated magnetic field.

Upon reproduction, measurement was conducted using DC light having a laser power of about 2.5 mW. As a result of the measurement, a satisfactory signal was obtained even when the mark length is smaller than or equal to about 0.2 μm, similar to Example 9.

Even when the linear velocity of the medium was increased up to about 15 m/sec upon reproduction, the reproduction characteristic was not reduced. The laser power, which causes the intermediate layer to have a temperature greater than or equal to the Curie temperature, varied depending on the linear velocity. When the linear velocity were changed, the reproducing power was adjusted again. The increased linear velocity required a larger level of reproducing laser power.

Polarization-microscope observation directly confirmed that the magnetic domain wall in the reproducing layer moved due to temperature gradient, when the medium was moved at a low speed.

Here the composition of the reproducing layer was such that the compensation composition temperature was close to the reproducing temperature and the Curie temperature was greater than or equal to about 300° C. The reproducing layer may include a plurality of magnetic layers having different Curie temperatures. Alternatively, the amount of Cr and the amount of Gd may have gradients in the depth direction, and the intermediate layer side of the reproducing layer may have a low Curie temperature and a low compensation composition temperature, thereby obtaining easier control of the movement of the magnetic domain wall.

In the above-described Example 10, the rewritable recording region in the magneto-optical recording medium has the prepits arranged discretely and has a shape of a flat plane. When the characteristic of cross elimination by an adjacent track is evaluated, the magneto-optical recording medium of Example 10 has substantially no difference in such a characteristic from when a conventional structure having a guide groove. Therefore, a sufficient recording power margin can be secured even when a track pitch is about 1.0 μm or less. In particular, when the track pitch is about 0.6 μm or less and a write start power is about 6.0 mW, laser power of 9.5 mW or greater, in which the cross elimination is caused by the adjacent track, secures the recording power margin.

In Example 10, the coercive force of the recording layer is required to be about 3 KOe or greater at room temperature. This is a characteristic required to hold the recording magnetic domain of the recording layer. The TbFeCo film included in the recording layer is heated to the Curie temperature or greater for recording and erasing. For this reason, the Curie point of the recording layer in Example 10 is set to a value higher than that of a conventional recording layer. However, a coercive force is suddenly decreased when the temperature of the recording layer is increased to about 200° C. This is substantially no problem with the power required for recording.

As described above, according to Example 10, at least one of the intermediate layer, a reproducing aid layer, and the movement controlling layer is provided between the reproducing layer and the recording layer. In the reproducing temperature range, the recording magnetic domain of the recording layer is reproduced by transcribing and forming the recording magnetic domain onto the reproducing layer via the reproducing aid layer. Alternatively, when the temperature is increased, the transcribed magnetic domain is enlarged by movement of the magnetic domain wall. In this case, the disk substrate has a flat signal surface where the prepits are discretely formed. Therefore, the magnetic domain wall is stably moved and a change in the movement state is controlled. Thus, the magneto-optical recording medium has the large amplitude of a signal transcribed from the recording layer to the reproducing layer and a high quality of signal.

The magneto-optical recording medium of each of the foregoing Examples includes the dielectric layers 2 and 6 made of a ZnS film. Alternatively, the ZnS film may be replaced with a chalcogen film, an oxide film such as $TaO_2$, nitride film such as SiN, or a compound film thereof.

In Example 10, the reproducing layer is made of a GdFeCo film. The reproducing aid layer is made of a GdFe film. The intermediate layer is made of a DyFe film which is magnetic film. The recording layer is made of a TbFeCo film. Alternatively, magnetic film included in each layer may be a rare earth-transition metal-based ferrimagnetic film, a Mn-based magnetic film, or another magnetic material film.

Further, the overcoat layer (protecting layer) may have a structure in which both sides are glued together using a polyurethane resin instead of an epoxy acrylate resin, a hot melt adhesive, or the like.

According to this invention, the saturated magnetization of the recording layer and reproducing aid layer is maximized around a temperature at which a signal in the recording layer is transcribed. The signal in the recording layer is transcribed due to a static magnetic field. The masking of magnetic super-resolution by the shrink operation as well as the ability of transcribing the recorded signal onto the reproducing layer can be improved, thereby obtaining the magneto-optical recording medium to/from which information can be write or read in high density. The magneto-optical recording medium having excellent signal quality in high-density recording and the method for reproducing a signal from the medium are provided.

Further, according to this invention, the magneto-optical recording medium includes the intermediate layer and the reproducing aid layer between the reproducing layer and the recording layer. In the reproducing temperature range, the recording magnetic domain in the recording layer is transcribed onto the reproducing layer via the reproducing layer aid layer and is then reproduced. Outside the reproducing temperature range, the magnetic domain shrinks and disappears in the reproducing layer. When the temperature is increased, the transcribed magnetic domain is enlarged and then reproduced.

In this case, the disk substrate has a flat signal surface on which the prepits are discretely formed. Therefore, the magnetic domain wall can be stably moved. A change in a movement state is prevented, thereby improving signal quality.

As described above, in the magneto-optical recording medium of this invention, an external magnetic field for initialization (initializing magnetic field) is not required. The masking of the reproducing layer by the shrink action (magnetic domain wall shrink action) as well as the transcription of a signal from the recording layer can be both obtained. The masking or the transcription does not degrade the reproduction characteristic. Further, when reproducing power is varied, a region to which the recording magnetic domain of the recording layer is transcribed has a constant size, thereby obtaining excellent reproduction characteristic.

According to the method for reproducing the magneto-optical recording medium of this invention, magnetic film included in each layer of the magnetic structure of the magneto-optical recording medium is heated by irradiation of a laser beam upon reproduction. The reproducing aid layer and the intermediate layer made of non-magnetic or magnetic material are provided. Therefore, the reproducing layer is not substantially affected by the recording magnetic domain of the recording layer. The recording magnetic domain of the reproducing layer which is positioned in the low temperature region shrinks due to influence of a surrounding magnetization. The resultant magnetization of the reproducing layer is therefore directed in a single direction in a stable way. With the above-described structure, the recording magnetic domain formed in the recording layer is prevented from being transcribed onto the reproducing layer. Information can thus be read only from the recording magnetic domain formed on a position corresponding to a particular temperature portion of the recording layer within the reproducing light spot.

Further, the Curie temperature of the reproducing aid layer is set to a temperature at which a magnetic coupling force between the reproducing layer and the recording layer is cut off, or a temperature at which the magnetic domain wall can be moved in the reproducing layer. A region where information is read from the recording magnetic domain can be further limited. A transcribed magnetic domain which is larger than the recording magnetic domain can be formed and reproduced.

Furthermore, in this invention, at least one of the intermediate layer, the reproducing aid layer, and the movement controlling layer is provided between the reproducing layer and the recording layer. The reproducing layer and the recording layer are provided on the disk substrate having a flat signal surface on which the prepits are discretely provided. In the reproducing temperature range, the recording magnetic domain of the recording layer is transcribed onto the reproducing layer via the reproducing aid layer and is then reproduced. Alternatively, when the temperature is increased, the transcribed magnetic domain is enlarged due to the magnetic domain wall movement and is then reproduced. Therefore, the magnetic domain wall movement is stable, and a change in a movement state is prevented. Signal quality can be thus improved.

As described above, according to this invention, the reproduction resolution of information recorded in the magneto-optical recording medium can be increased. Further, the size of the transcribed magnetic domain is stably controlled, so that the amplitude of a signal can be increased. Therefore, a magneto-optical recording medium having a high density and excellent signal characteristic is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magneto-optical recording medium, comprising:
   a substrate; and
   a reproducing layer and a recording layer provided on the substrate, wherein:
   a recording magnetic domain is provided in the recording layer by heating the recording layer by irradiation with light and applying a recording magnetic field to the recording layer so that information is recorded in the recording layer;
   the recording layer is a magnetic film having magnetic anisotropy in a direction perpendicular to the film surface, and the magnetic film holds the recording magnetic domain formed therein;
   the magnetic domain recorded in the recording layer is transcribed onto the reproducing layer in a vertical magnetization direction and subsequently disappears substantially automatically because of a shrink force of the reproducing layer; and
   a coercive force of the reproducing layer is smaller than a transcribing magnetic field from the recording layer to the reproducing layer in a temperature region greater than or equal to a reproducing and transcribing temperature at which the magnetic domain of the recording layer is transcribed onto the reproducing layer.

2. A magneto-optical recording medium according to claim 1, comprising a disk substrate on which prepits are discretely provided; a recording layer in which information is recorded by a magnetization having a vertical direction; and a reproducing layer onto which a magnetic domain recorded in the recording layer is transcribed by the magnetization having a vertical direction.

3. A magneto-optical recording medium according to claim 1, wherein a guide groove has a convex-and-concave shape and is provided on the disk substrate.

4. A magneto-optical recording medium according to claim 1, wherein the reproducing layer, onto which a magnetic domain recorded in the recording layer is transcribed by the magnetization having a vertical direction, is magnetically separated between each information track.

5. A magneto-optical recording medium according to claim 1, wherein at least a magnetic layer having magnetic anitsotropy in a direction perpendicular to the film surface is provided between the recording layer and the reproducing layer; a magnetic domain recorded in the recording layer is transcribed onto the reproducing layer by the magnetization having a vertical direction; and the Curie temperature of the at least magnetic layer is smaller than the Curie temperature of the recording layer and the reproducing layer.

6. A magneto-optical recording medium according to claim 1, wherein the reproducing layer, onto which a magnetic domain recorded in the recording layer is transcribed by the magnetization having a vertical direction, has a compensation composition temperature smaller than the reproducing and transcribing temperature at which the magnetic domain of the recording layer is transcribed onto the reproducing layer.

7. A magneto-optical recording medium according to claim 1, further comprises a non-magnetic intermediate layer between the recording layer and the reproducing layer; and a magnetic domain recorded in the recording layer is transcribed onto the reproducing layer by the magnetization having a vertical direction.

8. A magneto-optical recording medium according to claim 1, further comprises an intermediate magnetic layer between the recording layer and the reproducing layer; a magnetic domain recorded in the recording layer is transcribed onto the reproducing layer by the magnetization having a vertical direction; and the intermediate magnetic layer has an in-plane magnetic anisotropy in a temperature region smaller than or equal to the reproducing and transcribing temperature at which the magnetic domain of the recording layer is transcribed onto the reproducing layer.

9. A magneto-optical recording medium according to claim 1, wherein a coercive force of the reproducing layer is smaller than the intensity of a modulated magnetic field when recording in a temperature range of from room temperature to about 100° C.

10. A magneto-optical recording medium according to claim 1, wherein a coercive force of the recording layer is greater than or equal to about 3 KOe at room temperature; and the coercive force is smaller than or equal to about 500 Oe in a temperature range of from about 200° C. to about 250° C.

11. A method for reproducing recorded information from a magneto-optical recording medium according to claim 1, wherein a light beam is moved relative to the medium; the medium is irradiated with the light beam from the reproducing layer side; a temperature distribution which has a gradient in a moving direction of a spot of the light beam is provided on the medium; the temperature distribution includes a temperature region greater than at least the Curie temperature of an intermediate magnetic layer; a magnetic domain wall of a transcribed magnetic domain of the reproducing layer is moved; and a change in polarized plane of a reflected light of the light beam is detected to reproduce the recorded information, wherein the intermediate magnetic layer is provided between the reproducing layer and the recording layer.

12. An apparatus for reproducing recorded information from a magneto-optical recording medium according to claim 1, wherein the apparatus comprises a heating section for providing a temperature distribution which has a gradient in a moving direction of a spot of a light beam on the magneto-optical recording medium; and a change in polarized plane of a reflected light of the light beam is detected to reproduce the recorded information.

13. A magneto-optical recording medium, comprising:
a substrate; and
a reproducing layer and a recording layer provided on the substrate, wherein:
a recording magnetic domain is provided in the recording layer by heating the recording layer by irradiation with light and applying a recording magnetic field to the recording layer so that information is recorded in the recording layer;
the recording layer is a magnetic film having magnetic anisotropy in a direction perpendicular to the film surface, and the magnetic film holds the recording magnetic domain formed therein;
the magnetic domain recorded in the recording layer is transcribed onto the reproducing layer in a vertical magnetization direction and subsequently disappears substantially automatically because of a shrink force of the reproducing layer; and
a coercive force of the reproducing layer is smaller than the intensity of a magnetic field inverting magnetization of the recording layer in a temperature region greater than or equal to a reproducing and transcribing temperature at which the magnetic domain of the recording layer is transcribed onto the reproducing layer.

14. A magneto-optical recording medium according to claim 13, comprising a disk substrate on which prepits are discretely provided; a recording layer in which information is recorded by a magnetization having a vertical direction; and a reproducing layer onto which a magnetic domain recorded in the recording layer is transcribed by the magnetization having a vertical direction.

15. A magneto-optical recording medium according to claim 14, wherein a guide groove has a convex-and-concave shape and is provided on the disk substrate.

16. A magneto-optical recording medium according to claim 13, wherein the reproducing layer, onto which a magnetic domain recorded in the recording layer is transcribed by the magnetization having a vertical direction, is magnetically separated between each information track.

17. A magneto-optical recording medium according to claim 13, wherein at least a magnetic layer having magnetic anitsotropy in a direction perpendicular to the film surface is provided between the recording layer and the reproducing layer; a magnetic domain recorded in the recording layer is transcribed onto the reproducing layer by the magnetization having a vertical direction; and the Curie temperature of the at least magnetic layer is smaller than the Curie temperature of the recording layer and the reproducing layer.

18. A magneto-optical recording medium according to claim 13, wherein the reproducing layer, onto which a magnetic domain recorded in the recording layer is transcribed by the magnetization having a vertical direction, has a compensation composition temperature smaller than the reproducing and transcribing temperature at which the magnetic domain of the recording layer is transcribed onto the reproducing layer.

19. A magneto-optical recording medium according to claim 13, further comprises a non-magnetic intermediate layer between the recording layer and the reproducing layer; and a magnetic domain recorded in the recording layer is transcribed onto the reproducing layer by the magnetization having a vertical direction.

20. A magneto-optical recording medium according to claim 13, further comprises an intermediate magnetic layer between the recording layer and the reproducing layer; a magnetic domain recorded in the recording layer is transcribed onto the reproducing layer by the magnetization having a vertical direction; and the intermediate magnetic layer has an in-plane magnetic anisotropy in a temperature region smaller than or equal to the reproducing and transcribing temperature at which the magnetic domain of the recording layer is transcribed onto the reproducing layer.

21. A magneto-optical recording medium according to claim 13, wherein a coercive force of the reproducing layer is smaller than the intensity of a modulated magnetic field when recording in a temperature range of from room temperature to about 100° C.

22. A magneto-optical recording medium according to claim 13, wherein a coercive force of the recording layer is greater than or equal to about 3 KOe at room temperature; and the coercive force is smaller than or equal to about 500 Oe in a temperature range of from about 200° C. to about 250° C.

23. A method for reproducing recorded information from a magneto-optical recording medium according to claim 13, wherein a light beam is moved relative to the medium; the medium is irradiated with the light beam from the reproducing layer side; a temperature distribution which has a gradient in a moving direction of a spot of the light beam is provided on the medium; the temperature distribution includes a temperature region greater than at least the Curie temperature of an intermediate magnetic layer; a magnetic domain wall of a transcribed magnetic domain of the reproducing layer is moved; and a change in polarized plane of a reflected light of the light beam is detected to reproduce the recorded information, wherein the intermediate magnetic layer is provided between the reproducing layer and the recording layer.

24. An apparatus for reproducing recorded information from a magneto-optical recording medium according to claim 13, wherein the apparatus comprises a heating section for providing a temperature distribution which has a gradient in a moving direction of a spot of a light beam on the magneto-optical recording medium; and a change in polarized plane of a reflected light of the light beam is detected to reproduce the recorded information.

25. A magneto-optical recording medium, comprising:

a substrate; and a reproducing layer and a recording layer provided on the substrate, wherein:

a recording magnetic domain is provided in the recording layer by heating the recording layer by irradiation with light and applying a recording magnetic field to the recording layer so that information is recorded in the recording layer;

the recording layer is a magnetic film having magnetic anisotropy in a direction perpendicular to the film surface, and the magnetic film holds the recording magnetic domain formed therein;

the magnetic domain recorded in the recording layer is transcribed onto the reproducing layer in a vertical magnetization direction and subsequently disappears substantially automatically because of a shrink force of the reproducing layer; and a coercive force of the reproducing layer is smaller than a force moving a magnetic domain wall of the reproducing layer in a temperature region greater than or equal to a reproducing and transcribing temperature at which the magnetic domain of the recording layer is transcribed onto the reproducing layer.

26. A magneto-optical recording medium according to claim 25, comprising a disk substrate on which prepits are discretely provided; a recording layer in which information is recorded by a magnetization having a vertical direction; and a reproducing layer onto which a magnetic domain recorded in the recording layer is transcribed by the magnetization having a vertical direction.

27. A magneto-optical recording medium according to claim 26, wherein a guide groove has a convex-and-concave shape and is provided on the disk substrate.

28. A magneto-optical recording medium according to claim 25, wherein the reproducing layer, onto which a magnetic domain recorded in the recording layer is transcribed by the magnetization having a vertical direction, is magnetically separated between each information track.

29. A magneto-optical recording medium according to claim 25, wherein at least a magnetic layer having magnetic anitsotropy in a direction perpendicular to the film surface is provided between the recording layer and the reproducing layer; a magnetic domain recorded in the recording layer is transcribed onto the reproducing layer by the magnetization having a vertical direction; and the Curie temperature of the at least magnetic layer is smaller than the Curie temperature of the recording layer and the reproducing layer.

30. A magneto-optical recording medium according to claim 25, wherein the reproducing layer, onto which a magnetic domain recorded in the recording layer is transcribed by the magnetization having a vertical direction, has a compensation composition temperature smaller than the reproducing and transcribing temperature at which the magnetic domain of the recording layer is transcribed onto the reproducing layer.

31. A magneto-optical recording medium according to claim 25, further comprises a non-magnetic intermediate layer between the recording layer and the reproducing layer; and a magnetic domain recorded in the recording layer is transcribed onto the reproducing layer by the magnetization having a vertical direction.

32. A magneto-optical recording medium according to claim 25, further comprises an intermediate magnetic layer between the recording layer and the reproducing layer; a magnetic domain recorded in the recording layer is transcribed onto the reproducing layer by the magnetization having a vertical direction; and the intermediate magnetic layer has an in-plane magnetic anisotropy in a temperature region smaller than or equal to the reproducing and transcribing temperature at which the magnetic domain of the recording layer is transcribed onto the reproducing layer.

33. A magneto-optical recording medium according to claim 25, wherein a coercive force of the reproducing layer is smaller than the intensity of a modulated magnetic field when recording in a temperature range of from room temperature to about 100° C.

34. A magneto-optical recording medium according to claim 25, wherein a coercive force of the recording layer is greater than or equal to about 3 KOe at room temperature; and the coercive force is smaller than or equal to about 500 Oe in a temperature range of from about 200° C. to about 250° C.

35. A method for reproducing recorded information from a magneto-optical recording medium according to claim 25, wherein a light beam is moved relative to the medium; the medium is irradiated with the light beam from the reproducing layer side; a temperature distribution which has a gradient in a moving direction of a spot of the light beam is provided on the medium; the temperature distribution includes a temperature region greater than at least the Curie temperature of an intermediate magnetic layer; a magnetic domain wall of a transcribed magnetic domain of the reproducing layer is moved; and a change in polarized plane of a reflected light of the light beam is detected to reproduce the recorded information, wherein the intermediate magnetic layer is provided between the reproducing layer and the recording layer.

36. An apparatus for reproducing recorded information from a magneto-optical recording medium according to claim 25, wherein the apparatus comprises a heating section for providing a temperature distribution which has a gradient in a moving direction of a spot of a light beam on the magneto-optical recording medium; and a change in polarized plane of a reflected light of the light beam is detected to reproduce the recorded information. The magnetic domain recorded in the recording layer is transcribed onto the reproducing layer in a vertical magnetization direction.

* * * * *

UNITED STATES PATENT AND TRADEMARK OFFICE
CERTIFICATE OF CORRECTION

| | | |
|---|---|---|
| PATENT NO. | : 6,853,606 B2 | Page 1 of 1 |
| APPLICATION NO. | : 10/315274 | |
| DATED | : February 8, 2005 | |
| INVENTOR(S) | : Motoyoshi Murakami et al. | |

It is certified that error appears in the above-identified patent and that said Letters Patent is hereby corrected as shown below:

Col. 40, lines 20-22
Claim 3 should read as follows:
A magneto-optical recording medium according to claim 2 claim 1, wherein a guide groove has a convex-and-concave shape and is provided on the disk substrate.

Signed and Sealed this

Third Day of July, 2007

JON W. DUDAS
*Director of the United States Patent and Trademark Office*